United States Patent
Gao et al.

(10) Patent No.: US 12,335,751 B2
(45) Date of Patent: Jun. 17, 2025

(54) METHOD FOR UPLINK TRANSMISSION ASSOCIATED WITH ANTENNA PORT AND PANEL SWITCHING

(71) Applicant: ZTE CORPORATION, Guangdong (CN)

(72) Inventors: Bo Gao, Shenzhen (CN); Zhaohua Lu, Shenzhen (CN); Hao Wu, Shenzhen (CN); Chuangxin Jiang, Shenzhen (CN); Wenjun Yan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 175 days.

(21) Appl. No.: 17/855,409

(22) Filed: Jun. 30, 2022

(65) Prior Publication Data

US 2022/0338027 A1    Oct. 20, 2022

Related U.S. Application Data

(63) Continuation of application No. PCT/CN2020/104352, filed on Jul. 24, 2020.

(51) Int. Cl.
| | |
|---|---|
| H04W 16/28 | (2009.01) |
| H04L 5/00 | (2006.01) |
| H04W 74/08 | (2024.01) |
| H04W 74/0816 | (2024.01) |

(52) U.S. Cl.
CPC ........... *H04W 16/28* (2013.01); *H04L 5/0051* (2013.01); *H04W 74/0816* (2013.01); *H04W 74/0866* (2013.01)

(58) Field of Classification Search
CPC ............. H04W 16/28; H04W 74/0816; H04W 74/0866; H04L 5/0051; H04L 5/0025; H04L 5/0048; H04B 7/0404; H04B 7/0602; H04B 7/0695; H04B 7/088; H04B 7/0691

See application file for complete search history.

(56) References Cited

U.S. PATENT DOCUMENTS

| | | |
|---|---|---|
| 2005/0249159 A1 | 11/2005 | Abraham et al. |
| 2019/0103908 A1 | 4/2019 | Yu et al. |
| 2019/0281588 A1 | 9/2019 | Zhang et al. |
| 2019/0297603 A1 | 9/2019 | Guo et al. |

(Continued)

FOREIGN PATENT DOCUMENTS

| | | |
|---|---|---|
| CN | 103001732 A | 3/2013 |
| CN | 108112075 A | 6/2018 |
| CN | 110324884 A | 10/2019 |

(Continued)

OTHER PUBLICATIONS

International Search Report and Written Opinion for PCT Appl. No. PCT/CN2020/104352, mailed Apr. 2, 2021 (8 pages).

(Continued)

*Primary Examiner* — Eric Myers
(74) *Attorney, Agent, or Firm* — Foley & Lardner LLP

(57) ABSTRACT

A wireless communication method for use in a wireless terminal is disclosed. The wireless communication method comprises determining at least one transmission state for an uplink channel, wherein at least one of a spatial relation or an antenna port of the uplink channel is determined based on a first transmission state of the at least one transmission state, and transmitting, to a wireless network node, the uplink channel.

16 Claims, 8 Drawing Sheets

(56) References Cited

U.S. PATENT DOCUMENTS

2021/0084510 A1* 3/2021 Ryu ...................... H04W 72/21
2023/0337142 A1* 10/2023 Go ...................... H04W 52/146

FOREIGN PATENT DOCUMENTS

| CN | 110741592 A | 1/2020 |
|---|---|---|
| CN | 110838856 A | 2/2020 |
| CN | 110945822 A | 3/2020 |
| CN | 111164905 A | 5/2020 |
| CN | 112602284 A | 4/2021 |
| EP | 2 712 109 A1 | 3/2014 |
| WO | WO-2015/040579 A1 | 3/2015 |
| WO | WO-2019/197044 A1 | 10/2019 |

OTHER PUBLICATIONS

AT&T et al., "RAN1 UE features list for Rel-16 NR" 3GPP TSG RAN WG1 #100-e, R1-2000930, Mar. 6, 2020, e-meeting (158 pages).

Ericsson, "Corrections for Full Power UL Transmission" 3GPP TSG-RAN WG1 Meeting #100bis, R1-2002368, Apr. 30, 2020, e-Meeting (12 pages).

Extended European Search Report for EP Appl. No. 20945968.4, dated Feb. 8, 2023 (15 pages).

Intel Corporation et al., "UE capabilities for RAN1 feature list" 3GPP TSG RAN WG2 Meeting #109bis-e, R2-2003374, Apr. 30, 2020, e-Meeting (46 pages).

Intel Corporation et al., "Update for Rel-16 UE capabilities" 3GPP TSG RAN WG2 Meeting #109bis-e, R2-2003375, Apr. 30, 2020, e-Meeting (70 pages).

Intel Corporation, "UE Capability for Rel-16 NR mobility enhancement" 3GPP TSG-RAN WG2 Meeting #109b electronic, R2-2003368, Apr. 30, 2020, e-Meeting (46 pages).

Mediatek Inc., "Motivation to introduce new R17 WI on further RRM enhancement (RAN4)" 3GPP TSG RAN Meeting #87e, RP-200162, Mar. 19, 2020, e-meeting (7 pages).

OPPO, "Text proposals for full TX power UL transmission" 3GPP TSG RAN WG1 #100bis, R1-2001728, Apr. 30, 2020, e-meeting (9 pages).

Qualcomm Incorporated, "Discussion", 3GPP TSG RAN WG1 Meeting #100-e, R1-2000984, Mar. 6, 2020 (79 pages).

Qualcomm, Inc., "Discussion on UE features for CLI" 3GPP TSG RAN WG1 #101, R1-2004486, Jun. 5, 2020, E-Meeting (46 pages).

Qualcomm, Inc., "Discussion on UE features for MR-DC/CA" 3GPP TSG RAN WG1 #101, R1-2004478 (revision of R1-2004485), Jun. 5, 2020, e-Meeting (51 pages).

Qualcomm, Inc., "Discussion on UE features for MR-DC/CA" 3GPP TSG RAN WG1 #101, R1-2004485, Jun. 5, 2020, e-Meeting (51 pages).

ZTE, "Preliminary views on further enhancement for NR MIMO" 3GPP TSG RAN WG1 Meeting #101-e, R1-2003483, Jun. 5, 2020, e-Meeting (18 pages).

First Office Action for CN Appl. No. 202080089083.X, dated Sep. 4, 2024 (with English translation, 32 pages).

* cited by examiner

Intra-panel antenna switching

Intra-panel switching

Partial Inter-panel switching

Full Inter-panel switching

METHOD FOR UPLINK TRANSMISSION ASSOCIATED WITH ANTENNA PORT AND PANEL SWITCHING

CROSS-REFERENCE TO RELATED APPLICATION

This application claims the benefit of priority under 35 U.S.C. § 120 as a continuation of PCT Patent Application No. PCT/CN2020/104352, filed on Jul. 24, 2020, the disclosure of which is incorporated herein by reference in its entirety.

TECHNICAL FIELD

This document is directed generally to wireless communications.

SUMMARY

When wide or ultra-wide spectrum resources are used, a considerable propagation loss induced by an extremely high frequency becomes a noticeable challenge. To solve this challenge, an antenna array and beam-forming training technologies using massive Multiple Input Multiple Output (MIMO), e.g. up to 1024 antenna elements for one node, have been adopted to achieve beam alignments and obtain a sufficiently high antenna gain. In order to keep implementation cost low while still benefiting from such a large antenna array, analog phase shifters become a highly attractive option for implementing mmWave beam-forming. That is, the number of controllable phases is finite and the constant modulus constraints are placed on these antenna elements to reduce the cost of implementing the antenna array. Given pre-specified beam patterns, the variable-phase-shift-based beam forming training targets to identify the best pattern for subsequent data transmissions, generally, in a case of one-TRP (transmission (Tx) reception (Rx) point) and one-panel. FIG. 1 shows a schematic diagram of the case of one-TRP and one-panel. In FIG. 1, the TRP and a user equipment (UE) with one panel perform beam-based uplink/downlink (UL/DL) transmissions, where beams with the full line represent the selected Tx/Rx beams for the UL/DL transmissions.

In order to improve a UL transmission performance (especially considering a UE blockage and the maximum permissible exposure (MPE)), the UL transmissions with multi-panels may be considered in beyond-5G networks and the following evolutions. For instance, there may be up to two TRPs and each of TRPs has one or more TRP panels. Meanwhile, on the UE side, there may be multiple UE panels, and a portion of the UE panels can be active for the transmissions. In a given time, it is assumed that only one panel can be used for the UL transmissions. That is, a fast panel switching may be implemented.

FIGS. 2A and 2B show two typical cases: intra-panel antenna switching and inter-panel antenna switching. More specifically, FIG. 2A shows the case of intra-panel antenna switching. In FIG. 2A, transmissions of sounding reference signals (SRSs) for different UE antenna ports (i.e. UE antenna port a and UE antenna port b shown in FIG. 2A) may share the same UL power control parameter(s) and the same spatial relation. For example, both of the UE antenna ports a and b may correspond to a positive/negative polarization.

FIG. 2B shows the case of inter-panel antenna switching. In FIG. 2B, the SRS transmissions for different UE antenna ports/panels (i.e. UE panels 1 and 2 or UE antenna ports 1 and 2 shown in FIG. 2B) may correspond to different UL power control parameter(s) and different spatial relations/beams, since each of the UE antenna ports/panels may experience different physical channel(s).

In addition, there may be separate requirements for time domain guard periods of intra-panel and inter-panel switching, which are up to UE implementation/capability.

This document relates to methods, systems, and devices for uplink transmissions associated with antenna port(s) and/or panel switching.

The present disclosure relates to a wireless communication method for use in a wireless terminal. The wireless communication method comprises:

determining at least one transmission state for an uplink channel, wherein at least one of a spatial relation or an antenna port of the uplink channel is determined based on a first transmission state of the at least one transmission state, and transmitting, to a wireless network node, the uplink channel.

Various embodiments may preferably implement the following features:

Preferably, one of the at least one transmission state is associated with one or more reference signals.

Preferably, the at least one of the spatial relation or the antenna port of the uplink channel is determined based on one of the one or more reference signals associated with the first transmission state.

Preferably, the at least one transmission state is associated with one or more reference signals and the wireless communication method further comprises determining at least one of the one or more reference signals associated with the first transmission state for the uplink channel, wherein the at least one of the spatial relation or the antenna port of the uplink channel is determined further based on one of the determined at least one reference signal.

Preferably, the at least one transmission state is associated with one or more downlink reference signals, and wherein a pathloss reference signal is determined based on at least one of the one or more downlink reference signals.

Preferably, the at least one of the one or more downlink reference signals relates to at least one spatial parameter.

Preferably, the at least one of the one or more downlink reference signals corresponds to at least one of: the downlink reference signal resource with the lowest or the highest resource identification in the at least one transmission state, or the downlink reference signal resource as the first entry in the at least one transmission state.

Preferably, a pathloss estimation is determined based on an average value of one or more pathloss estimations corresponding to the one or more downlink reference signals.

Preferably, one or more reference signals associated with the at least one transmission state comprise at least one of a downlink reference signal resource, a downlink reference signal port, a sounding reference signal, SRS, resource or an SRS port.

Preferably, one of the at least one transmission state comprises at least one of a transmission configuration indicator state or a spatial relation.

Preferably, one of the at least one transmission state is associated with at least one panel, at least one SRS resource or at least one SRS port.

Preferably, the SRS resources in one of the at least one transmission state are not within the same SRS resource set or are within separate SRS resource sets.

Preferably, the number of SRS resources, SRS ports or downlink reference signal resources in one of the at least one transmission state is smaller than or equal to a capability of the wireless terminal or a threshold.

Preferably, the SRS resources or the SRS ports in one of the at least one transmission state have different indexes or do not have the same indexes.

Preferably, the SRS resources or the SRS ports in one of the at least one transmission state have the same indexes or do not have different indexes.

Preferably, the wireless communication method further comprises receiving, from the wireless network node, a command indicating the at least one of the downlink reference signal resources, the downlink reference signal ports, the transmission configuration indicator states, the SRS resources or the SRS ports associated with one of the at least one transmission state.

Preferably, the wireless communication method further comprises receiving, from the wireless network node, downlink control information, DCI, indicating the first transmission state of the at least one transmission state, wherein a length of at least one of a transmitted precoding matrix indicator field or a SRS resource indicator field in the DCI is determined based on the maximum number of one of the downlink reference signal resources, the downlink reference signal ports, the transmission configuration indicator states, the SRS resources or the SRS ports associated with the first transmission state.

Preferably, the wireless communication method further comprises receiving, from the wireless network node, DCI indicating the at least one transmission state, wherein Q spatial relation(s), P antenna port(s), T antenna port group(s) of the uplink channel are determined based on a corresponding transmission state of the at least one transmission state in order, wherein Q, P, and T are positive integers.

Preferably, a length of at least one of a transmitted precoding matrix indicator field or a SRS resource indicator field in the DCI is determined based on the maximum number of one of the downlink reference signal resources, the downlink reference signal ports, the transmission configuration indicator states, transmission states, the SRS resources or the SRS ports associated with the at least one transmission state.

Preferably, the wireless communication method further comprises receiving, from the wireless network node, a transmitted precoding matrix indicator in DCI indicating precoding information of the at least one antenna port associated with the first transmission state.

Preferably, the one or more reference signals associated with the at least one transmission state comprise at least one SRS resource which is grouped into a plurality of SRS resource sets.

Preferably, at most X SRS resources of Y first SRS resource sets in the plurality of SRS resource sets and at most M SRS resources of N second SRS resource sets in the plurality of SRS resource sets are comprised in one of the at least one transmission state, wherein X, Y, M and N are positive integers.

Preferably, at most X SRS resources of Y first SRS resource sets in the plurality of SRS resource sets and at most M SRS resources of N second SRS resource sets in the plurality of SRS resource sets are transmitted simultaneously, and wherein X, Y, M and N are positive integers.

Preferably, the Y first SRS resource groups are associated with at least one antenna port shared by a plurality of transmission chains and the N second SRS resource groups are associated with at least one antenna port shared by another plurality of transmission chains.

The present disclosure relates to a wireless communication method for use in a wireless network node. The wireless communication method comprises:

transmitting, to a wireless terminal, a first command associated with at least one transmission state, and receiving, from the wireless terminal, an uplink channel, wherein at least one of a spatial relation or an antenna port of the uplink channel is determined based on a first transmission state of the at least one transmission state.

Various embodiments may preferably implement the following features:

Preferably, one of the at least one transmission state is associated with one or more reference signals, and wherein the at least one of the spatial relation or the antenna port of the uplink channel is determined based on one of the one or more reference signals associated with the first transmission state.

Preferably, the at least one transmission state is associated with one or more reference signals, wherein the first command further indicates at least one of the one or more reference signals associated with the first transmission state, and wherein the at least one of the spatial relation or the antenna port of the uplink channel is determined further based on one of the indicated at least one reference signal.

Preferably, the at least one transmission state is associated with one or more downlink reference signals, and wherein a pathloss reference signal is determined based on at least one of the one or more downlink reference signals.

Preferably, the at least one of the one or more downlink reference signals relates to at least one spatial parameter.

Preferably, the at least one of the one or more downlink reference signals corresponds to at least one of: the downlink reference signal resource with the lowest or the highest resource identification in the at least one transmission state, or the downlink reference signal resource as the first entry in the at least one transmission state.

Preferably, a pathloss estimation is determined based on an average value of one or more pathloss estimations corresponding to the one or more downlink reference signals.

Preferably, one or more reference signals associated with the at least one transmission state comprise at least one of a downlink reference signal resource, a downlink reference signal port, a sounding reference signal, SRS, resource or an SRS port.

Preferably, one of the at least one transmission state comprises at least one of a transmission configuration indicator state or a spatial relation.

Preferably, one of the at least one transmission state is associated with at least one panel, at least one sounding reference signal, SRS, resource or at least one SRS port.

Preferably, the SRS resources in one of the at least one transmission state are not within the same SRS resource set or are within separate SRS resource sets.

Preferably, the number of SRS resources, SRS ports or downlink reference signal resources in one of the at least one transmission state is smaller than or equal to a capability of the wireless terminal or a threshold.

Preferably, the threshold is predefined.

Preferably, the threshold is determined based on the capability of the wireless terminal.

Preferably, the SRS resources or the SRS ports in one of the at least one transmission state have different indexes or do not have the same indexes.

Preferably, the SRS resources or the SRS ports in one of the at least one transmission state have the same indexes or do not have different indexes.

Preferably, the wireless communication method further comprises transmitting, to the wireless terminal, a second command indicating the at least one of the downlink reference signal resources, the downlink reference signal ports, the transmission configuration indicator states, the SRS resources or the SRS ports associated with one of the at least one transmission state.

Preferably, the wireless communication method further comprises transmitting, to the wireless terminal, downlink control information indicating the first transmission state of the at least one transmission state, wherein a length of at least one of a transmitted precoding matrix indicator field or a SRS resource indicator field in the downlink control information, DCI, is determined based on the maximum number of one of the downlink reference signal resources, the downlink reference signal ports, the transmission configuration indicator states, the SRS resources or the SRS ports associated with the first transmission state.

Preferably, the wireless communication method further comprises transmitting, to the wireless terminal, downlink control information indicating at least one transmission state, wherein Q spatial relation(s), P antenna port(s), T antenna port group(s) of the uplink channel are determined based on a corresponding transmission state of the at least one transmission state in order, wherein Q, P, and T are positive integers.

Preferably, a length of at least one of a transmitted precoding matrix indicator field or a SRS resource indicator field in the downlink control information, DCI, is determined based on the maximum number of one of the downlink reference signal resources, the downlink reference signal ports, the transmission configuration indicator states, transmission states, the SRS resources or the SRS ports associated with the at least one transmission state.

Preferably, the wireless communication method further comprises transmitting, to the wireless terminal, a transmitted precoding matrix indicator in downlink control information indicating precoding information of the at least one antenna port associated with the first transmission state.

Preferably, the one or more reference signals associated with the at least one transmission state comprise at least one SRS resource which is grouped into a plurality of SRS resource sets.

Preferably, at most X SRS resources of Y first SRS resource sets in the plurality of SRS resource sets and at most M SRS resources of N second SRS resource sets in the plurality of SRS resource sets are comprised in one of the at least one transmission state, wherein X, Y, M and N are positive integers.

Preferably, at most X SRS resources of Y first SRS resource sets in the plurality of SRS resource sets and at most M SRS resources of N second SRS resource sets in the plurality of SRS resource sets are transmitted simultaneously, wherein X, Y, M and N are positive integers.

Preferably, the Y first SRS resource groups are associated with at least one antenna port shared by a plurality of transmission chains and the N second SRS resource groups are associated with at least one antenna port shared by another plurality of transmission chains.

The present disclosure relates to a wireless communication method for use in a wireless terminal. The wireless communication method comprises:

transmitting, to a wireless network node, an uplink channel in a first transmission mode, and transmitting, to the wireless network node, an uplink channel in a second transmission mode after a time gap, wherein each of the first transmission mode and the second transmission mode is determined based on at least one of a panel, a transmission state or the number of antenna ports.

Various embodiments may preferably implement the following features:

Preferably, the wireless communication method further comprises omitting an uplink transmission during the time gap.

Preferably, the first transmission mode and the second transmission mode are associated with at least one of different panels, different transmission states, different numbers of antenna ports or the number of panels.

Preferably, the first transmission mode and the second transmission mode indicate the number of antenna ports used for transmitting the uplink channels.

Preferably, the first transmission mode and the second transmission mode are configured by the wireless network node.

Preferably, at least one of a duration of the time gap, the maximum number of the antenna ports or the maximum number of the antenna ports of single transmission state is determined based on a capacity of the wireless terminal or a threshold.

Preferably, the threshold is predefined.

Preferably, the threshold is determined based on the capability of the wireless terminal.

The present disclosure relates to a wireless communication method for use in a wireless terminal. The wireless communication method comprises:

transmitting, to a wireless network node, an uplink channel in a first transmission mode in a time unit, and precluding a transmission of an uplink channel in a second transmission mode for a time gap after the time unit, wherein each of the first transmission mode and the second transmission mode is determined based on at least one of a panel, a transmission state or the number of antenna ports.

Various embodiments may preferably implement the following features:

Preferably, the first transmission mode and the second transmission mode are associated with at least one of different panels, different transmission states, different numbers of antenna ports or the number of panels.

Preferably, the first transmission mode and the second transmission mode indicate the number of antenna ports used for transmitting the uplink channels.

Preferably, the first transmission mode and the second transmission mode are configured by the wireless network node.

Preferably, at least one of a duration of the time gap, the maximum number of the antenna ports or the maximum number of the antenna ports of single transmission state is determined based on a capacity of the wireless terminal or a threshold.

Preferably, the threshold is predefined.

Preferably, the threshold is determined based on the capability of the wireless terminal.

The present disclosure relates to a wireless communication method for use in a wireless network node. The wireless communication method comprises:

receiving, from a wireless terminal, an uplink channel in a first transmission mode, and receiving, from the wireless terminal, an uplink channel in a second transmission mode after a time gap, wherein each of the first transmission mode and the second transmission mode is determined based on at least one of a panel, a transmission state or the number of antenna ports.

Various embodiments may preferably implement the following features:

Preferably, the first transmission mode and the second transmission mode are associated with at least one of different panels, different transmission states, different numbers of antenna ports or the number of panels.

Preferably, the first transmission mode and the second transmission mode indicate the number of antenna ports used for transmitting the uplink channels.

Preferably, the wireless communication method further comprises transmitting, to the wireless terminal, configurations of the first transmission mode and the second transmission mode.

Preferably, at least one of a duration of the time gap, the maximum number of the antenna ports or the maximum number of the antenna ports of single transmission state is determined based on a capacity of the wireless terminal or a threshold.

Preferably, the threshold is predefined.

Preferably, the threshold is determined based on the capability of the wireless terminal.

The present disclosure relates to a wireless terminal comprising:
- a communication unit configured to determine at least one transmission state for an uplink channel, wherein at least one of a spatial relation or an antenna port of the uplink channel is determined based on a first transmission state of the at least one transmission state, and
- a processor configured to transmit, to a wireless network node, the uplink channel.

Various embodiments may preferably implement the following feature:

Preferably, the processor is configured to perform a wireless communication method of any of the foregoing described methods.

The present disclosure relates to a wireless network node comprising a communication unit, configured to:
- transmit, to a wireless terminal, a first command associated with at least one transmission state, and
- receive, from the wireless terminal, an uplink channel,
- wherein at least one of a spatial relation or an antenna port of the uplink channel is determined based on a first transmission state of the at least one transmission state.

Various embodiments may preferably implement the following feature:

Preferably, the wireless network node further comprises a processor configured to perform a wireless communication method of any of the foregoing described methods.

The present disclosure relates to a wireless terminal, comprising a communication unit, configured to:
- transmit, to a wireless network node, an uplink channel in a first transmission mode, and
- transmit, to the wireless network node, an uplink channel in a second transmission mode after a time gap,
- wherein each of the first transmission mode and the second transmission mode is determined based on at least one of a panel, a transmission state or the number of antenna ports.

Various embodiments may preferably implement the following feature:

Preferably, the wireless terminal further comprises a processor configured to perform a wireless communication method of any of the foregoing described methods.

The present disclosure relates to a wireless terminal, comprising:
- a communication unit, configured to transmit, to a wireless network node, an uplink channel in a first transmission mode in a time unit, and
- a processor, configured to preclude a transmission of an uplink channel in a second transmission mode for a time gap after the time unit
- wherein each of the first transmission mode and the second transmission mode is determined based on at least one of a panel, a transmission state or the number of antenna ports.

Various embodiments may preferably implement the following feature:

Preferably, the processor is further configured to perform a wireless communication method of any of the foregoing described methods.

The present disclosure relates to a wireless network node, comprising:
- a communication unit, configured to:
- receive, from a wireless terminal, an uplink channel in a first transmission mode, and
- receive, from a wireless terminal, an uplink channel in a second transmission mode after a time gap,
- wherein each of the first transmission mode and the second transmission mode is determined based on at least one of a panel, a transmission state or the number of antenna ports.

Various embodiments may preferably implement the following feature:

Preferably, the wireless network node further comprises a processor configured to perform a wireless communication method of any of the foregoing described methods.

The present disclosure relates to a computer program product comprising a computer-readable program medium code stored thereupon, the code, when executed by a processor, causing the processor to implement a wireless communication method recited in any of foregoing methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

In 5G new radio (NR), analog beam-forming is firstly introduced into mobile communications for guaranteeing the robustness of high frequency communications. The corresponding analog beam-forming indication (also called as beam indication) involves both downlink (DL) and uplink (UL) transmissions. For the UL transmission, spatial relation information (e.g. a higher layer parameter spatialRelationInfo) has been introduced for supporting the beam indication for a UL control channel (i.e., a physical uplink control channel (PUCCH) and a sounding reference signal (SRS)). Besides, the beam indication for a UL data channel (i.e. a physical uplink shared channel (PUSCH)), is achieved through mapping between one or more SRS resources, which are indicated by gNB, and antenna ports of the UL data channel. Under such conditions, the beam configuration for the UL data channel can be accordingly derived from the spatial relation information association and/or mapping information between the SRS resources and the antenna ports of the UL data channel.

From a perspective of specification, current 5G NR solution is based on a scenario that there is only a single panel in the UE side, which means that only one DL Tx beam can be received, or only one UL Tx beam can be transmitted at a given time instant. In order words, if the UE have multiple panels, the panel activation or deactivation is totally up to implementations on the UE side.

Besides, in general, a UE antenna switching is used for achieving a DL channel state information (CSI) acquisition through transmitting the SRS in the UL channel according to a channel reciprocity. The current UE antenna switching is also used for single active panel case in the NR and the SRS resources for the UE antenna switching may have the same spatial relation, i.e., based on only one UL beam and only one UE panel.

For a UL data transmission, there may be single or multiple active UL panels at a given time instant. In the present disclosure, instead of adopting a dedicated SRS transmission (with a usage of codebook or non-codebook transmission), the UL data transmission may be determined according to the SRS for the antenna switching or the DL RS, in order to save an overhead of the SRS transmission and reduce a latency of the beam/panel switching.

More specifically, for the UL data transmission, the corresponding port parameter, the number of layers and precoding information (e.g., spatial relation or transmission precoding matrix indication (TPMI)) may be indicated clearly. If the SRS for other usages (rather than that used for codebook or non-codebook transmission) or the DL RS can be used for the UL data transmission, the port combination of some of candidate SRS ports or port association with one or more DL RS(s) should be fully considered.

Figure 1:
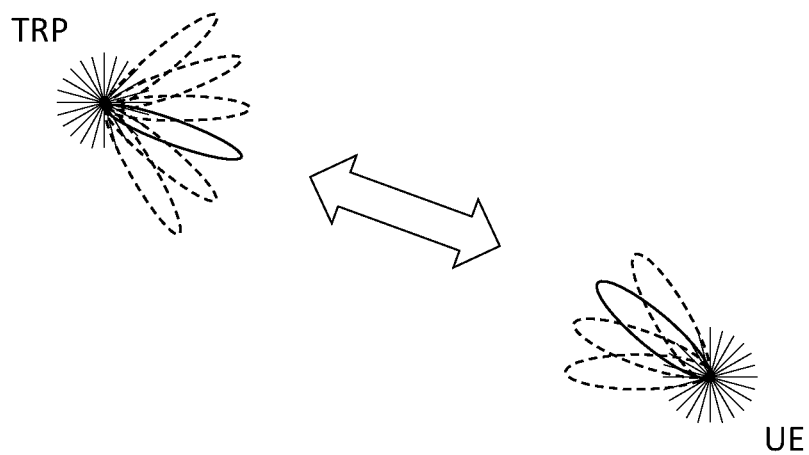
FIG. 1 shows a schematic diagram of the case of one-TRP and one-panel.
Figure 2A:
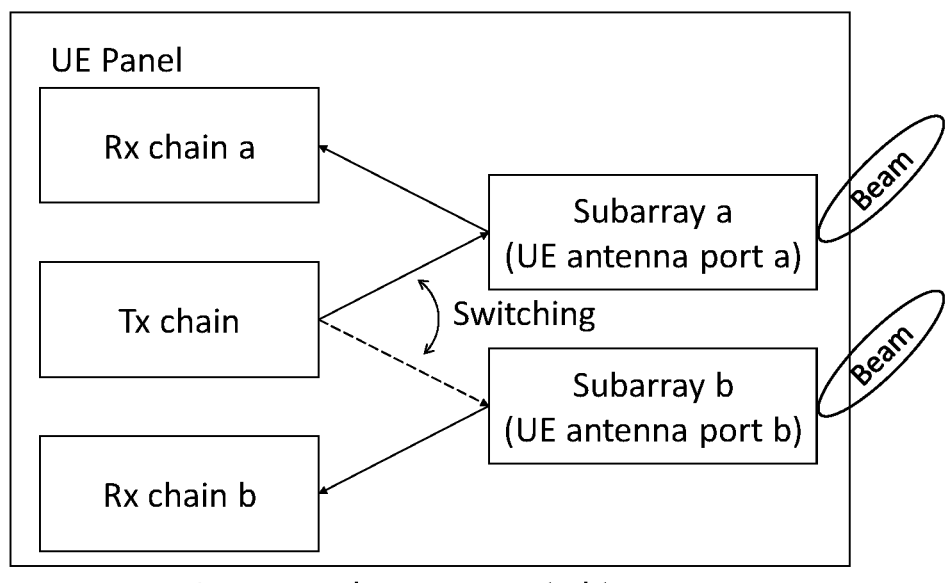
FIG. 2A show a case of intra-panel antenna switching.
Figure 2B:
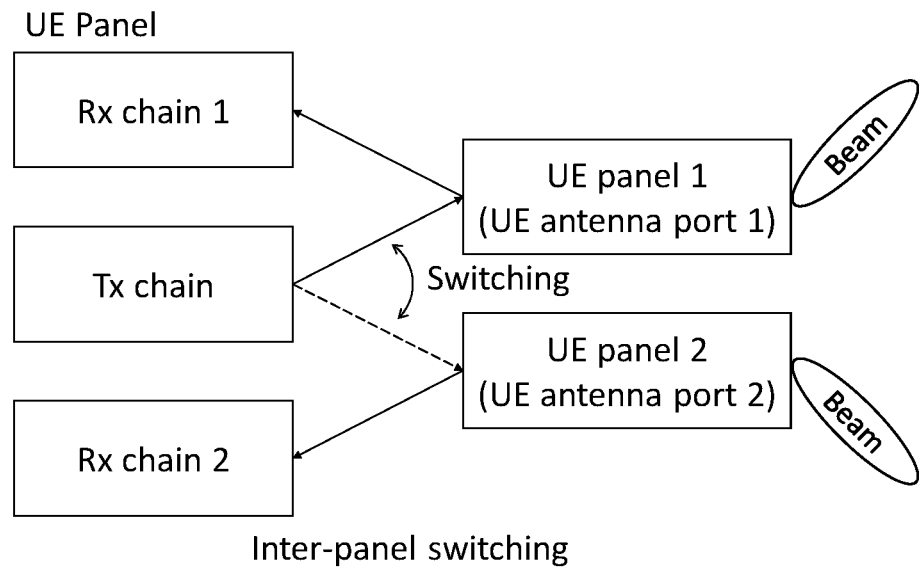
FIG. 2B shows a case of inter-panel antenna switching.

In order to achieve dynamic panel switching, transmission modes with candidate panel combinations (e.g., UE panel 1, UE panel 2, and UE panel 1 & panel 2 shown in FIG. 2B) may be considered. To be more specific, single transmission mode includes the following aspects: definition of the transmission mode (involving the number of Tx chains or number of candidate antenna ports in a given transmission mode), mapping between the transmission mode and UL resource(s), and a requirement for a transmission gap of switching between transmission modes.

In addition to a symmetric architecture, a heterogeneous antenna and panel architecture is introduced in the present disclosure for considering a wide variety of applicable scenarios in the NR. Consequently, in such case, the additional criteria of indicating the SRS and/or the DL RS for the UL data transmission may need to be re-considered. For instance, one UL panel of the UE may be associated with its own Tx chains and the other two UL panels of the UE may share the same Tx chains via the panel switching.

In the present disclosure, the definition of "transmission state" may be equivalent to a quasi-co-location (QCL) state, a transmission configuration indicator (TCI) state, a spatial relation (also called as spatial relation information), a reference signal (RS), a spatial filter or a pre-coding. Furthermore, in the present disclosure, the "transmission state" is also called as "beam", "transmission state codepoint" or "TCI codepoint".

In the present disclosure, the definition of "transmission state ID" is equivalent to a QCL state index, a TCI state index, spatial relation index, a reference signal index, a spatial filter index or a precoding index.

In the present disclosure, the RS comprises a channel state information reference signal (CSI-RS), a synchronization signal block (SSB) (which is also called as SS/PBCH (synchronization signal/physical broadcast channel)), a demodulation reference signal (DMRS), a sounding reference signal (SRS), or a physical random access channel (PRACH).

In the present disclosure, the spatial filter may be the spatial filter for either UE-side or gNB-side one, and the spatial filter is also called as a spatial-domain filter.

In the present disclosure, "spatial relation information" is comprised of one or more reference RSs, which is used to represent the same or quasi-co "spatial relation" between targeted "RS or channel" and the one or more reference RSs.

In the present disclosure, "spatial relation" may mean the beam, the spatial parameter, or the spatial domain filter.

In the present disclosure, "QCL state" is comprised of one or more reference RSs and their corresponding QCL type parameters, where the QCL type parameters include at least one of the following aspects or combinations: [1] a Doppler spread, [2] a Doppler shift, [3] a delay spread, [4] an average delay, [5] an average gain, and [6] a spatial parameter (which is also called as a spatial Rx parameter). In the present disclosure, "TCI state" is equivalent to "QCL state". In the present disclosure, there are the following definitions for 'QCL-TypeA', 'QCL-TypeB', 'QCL-TypeC', and 'QCL-TypeD'.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

In the present disclosure, "uplink channel" (UL channel) may be a physical UL control channel (PUCCH), a physical UL shared channel (PUSCH), a physical random access channel (PRACH).

In the present disclosure, "downlink reference signal" (DL RS) may be a SSB, a DMRS, or a CSI-RS.

In the present disclosure, "panel" is equivalent to an antenna group, an antenna port group, a beam group, a sub-array, a UE panel, a transmission entity/unit, or a reception entity/unit.

In the present disclosure, a panel switching is equivalent to an antenna group switching.

In the present disclosure, "time unit" may be a sub-symbol, a symbol, a slot, a sub-frame, a frame, a monitoring occasion or a transmission occasion.

In the present disclosure, "power control parameter" comprises a target power (also called as P0), a path loss RS, a scaling factor for a path loss (also called as alpha), or a closed loop process.

In the present disclosure, "path loss" can be a couple loss.

In the present disclosure, "antenna switching" can be "sounding procedure for DL CSI acquisition".

In the present disclosure, "at least one" may be equal to "one or more" and vice versa.

Figure 3:
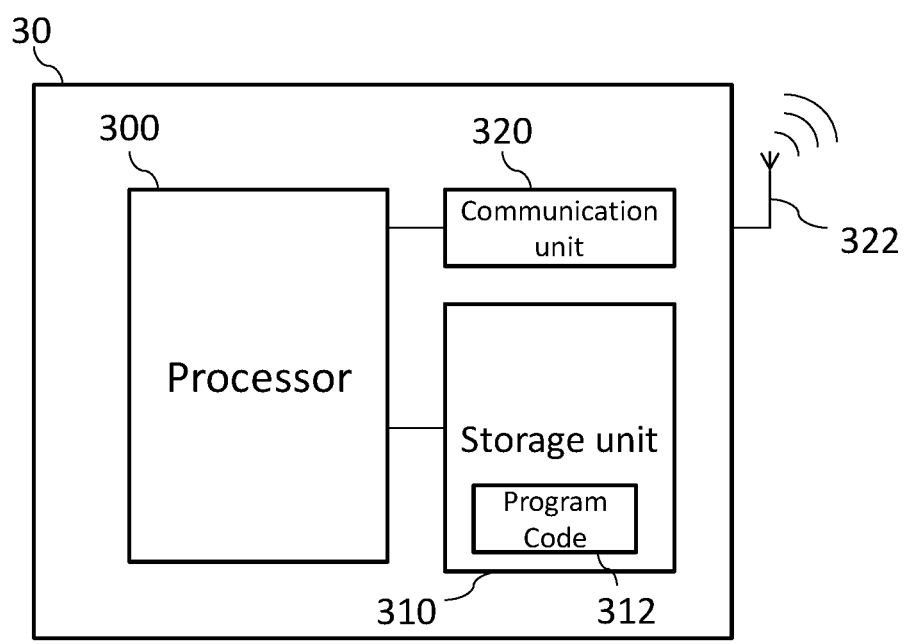
FIG. 3 shows an example of a schematic diagram of a wireless terminal according to an embodiment of the present disclosure.

FIG. 3 relates to a schematic diagram of a wireless terminal 30 according to an embodiment of the present disclosure. The wireless terminal 30 may be a user equipment (UE), a mobile phone, a laptop, a tablet computer, an electronic book or a portable computer system and is not limited herein. The wireless terminal 30 may include a processor 300 such as a microprocessor or Application Specific Integrated Circuit (ASIC), a storage unit 310 and a communication unit 320. The storage unit 310 may be any data storage device that stores a program code 312, which is accessed and executed by the processor 300. Embodiments of the storage unit 312 include but are not limited to a subscriber identity module (SIM), read-only memory (ROM), flash memory, random-access memory (RAM), hard-disk, and optical data storage device. The communication unit 320 may a transceiver and is used to transmit and receive signals (e.g. messages or packets) according to processing results of the processor 300. In an embodiment, the communication unit 320 transmits and receives the signals via at least one antenna 322 shown in FIG. 2.

In an embodiment, the storage unit 310 and the program code 312 may be omitted and the processor 300 may include a storage unit with stored program code.

The processor 300 may implement any one of the steps in exemplified embodiments on the wireless terminal 30, e.g., by executing the program code 312.

The communication unit 320 may be a transceiver. The communication unit 320 may as an alternative or in addition be combining a transmitting unit and a receiving unit configured to transmit and to receive, respectively, signals to and from a wireless network node (e.g. a base station).

Figure 4:
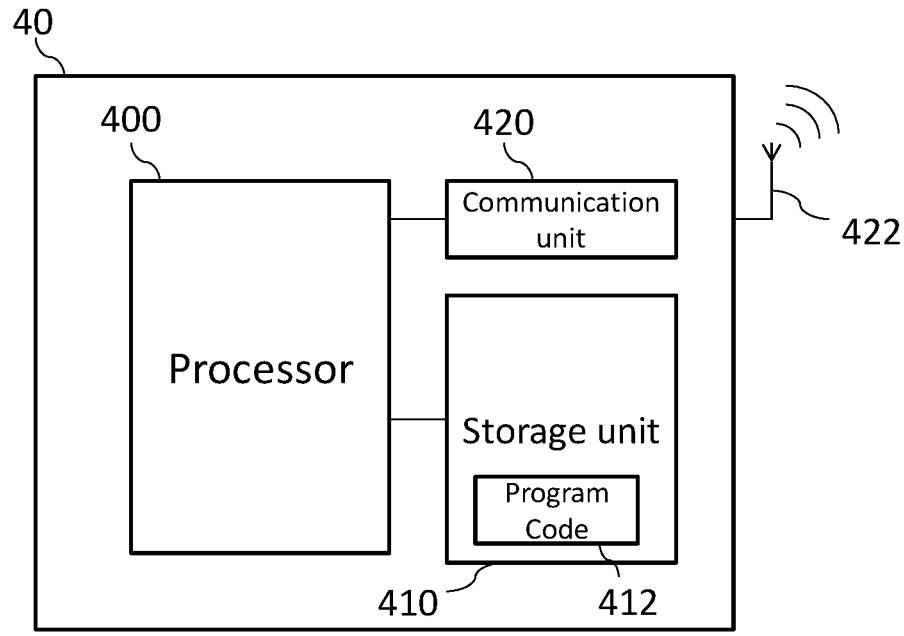
FIG. 4 shows an example of a schematic diagram of a wireless network node according to an embodiment of the present disclosure.

FIG. 4 relates to a schematic diagram of a wireless network node 40 according to an embodiment of the present disclosure. The wireless network node 40 may be a satellite, a base station (BS), a network entity, a Mobility Management Entity (MME), Serving Gateway (S-GW), Packet Data Network (PDN) Gateway (P-GW), a radio access network (RAN), a next generation RAN (NG-RAN), a data network, a core network or a Radio Network Controller (RNC), and is not limited herein. In addition, the wireless network node 40 may comprise (perform) at least one network function such as an access and mobility management function (AMF), a session management function (SMF), a user place function (UPF), a policy control function (PCF), an application function (AF), etc. The wireless network node 40 may include a processor 400 such as a microprocessor or ASIC, a storage unit 410 and a communication unit 420. The storage unit 410 may be any data storage device that stores a program code 412, which is accessed and executed by the processor 400. Examples of the storage unit 412 include but are not limited to a SIM, ROM, flash memory, RAM, hard-disk, and optical data storage device. The communication unit 420 may be a transceiver and is used to transmit and receive signals (e.g. messages or packets) according to processing results of the processor 400. In an example, the communication unit 420 transmits and receives the signals via at least one antenna 422 shown in FIG. 4.

In an embodiment, the storage unit 410 and the program code 412 may be omitted. The processor 400 may include a storage unit with stored program code.

The processor 400 may implement any steps described in exemplified embodiments on the wireless network node 40, e.g., via executing the program code 412.

The communication unit 420 may be a transceiver. The communication unit 420 may as an alternative or in addition be combining a transmitting unit and a receiving unit configured to transmit and to receive, respectively, signals to and from a wireless terminal (e.g. a user equipment).

In the following, various embodiments related to beam configurations for the UL data channel (e.g. UL transmissions) are illustrated. The skilled person in the art should acknowledge that these embodiments may be implemented individually or in any possible combination.

Embodiment 1: Unified Framework of PUSCH Port and Spatial Relation Indication Using DL RS and SRS In an embodiment, a port parameter and/or a spatial relation may be specified as a necessary transmission parameter for the UL transmissions (e.g. PUSCH transmissions). In order to unify the DL and UL transmissions, the PUSCH transmission may be only indicated by a unified transmission state that includes DL RS(s) or UL RS(s). In an embodiment, the DL RS comprises the CSI-RS and/or the SSB. In an embodiment, the UL RS comprises the SRS. More details are exemplified by the following cases.

Case 1: The PUSCH transmission is indicated with at least one transmission state, each of which is associated with at least one DL RS resource or at least one TCI state. In this embodiment, each of the at least one DL RS resource or the at least one TCI state is associated with a single PUSCH port and/or a spatial relation. Furthermore, the PUSCH transmission has P antenna port(s) (e.g., P=2), each of which is determined based on a corresponding transmission state in the at least one transmission state (e.g., that has P=2 corresponding transmission states) in order, wherein P is a positive integer. For instance, when P=2, in terms of the spatial relation or the reference antenna port determination, the first antenna port of the PUSCH transmission is determined according to the first transmission state, and the second antenna port is determined according to the second transmission state. Furthermore, the PUSCH transmission has T antenna port group(s) (e.g. when T=2, the first antenna port groups has 2 ports, and the second antenna port group has 1 port.), each of which is determined based on a corresponding transmission state of the at least one transmission state (e.g., that has T=2 transmission states) in order, wherein T is a positive integer.

In an embodiment, the power control parameter may be associated with the transmission state.

In an embodiment, the pathloss RS is determined according to the DL RS(s) associated with the at least one transmission state. For example, the DL RS(s) may be related to the QCL Type-D parameters (i.e. spatial Rx parameters). As an alternative or in addition, when there are more than one DL RSs related to the QCL Type-D parameter in the transmission state, the DL RS with the lowest RS resource ID or the first entry associated with the transmission state is applied for determining the pathloss of the PUSCH. As an alternative or in addition, when there are more than one DL RSs in the transmission state, the average value of pathlosses acquired based on the more than one DL RSs (i.e. pathloss estimations corresponding to the more than one DL RSs) is applied for determining the pathloss of the PUSCH.

Case 2: The PUSCH transmission is indicated with one transmission state that is associated with at least one SRS resource and/or at least one SRS port, wherein each of the at least one SRS resource or each of the at least one SRS port may be configured with separate spatial relations.

Case 3: The PUSCH transmission may be determined according to one transmission state and one SRS resource indicator (SRI) codepoint. In this embodiment, the transmission state corresponds to at least one SRS resource. As an alternative or in addition, the SRI codepoint is used to combine/indicate one or more of the SRS resources corresponding the transmission state for the PUSCH transmission.

Embodiment 2: Rules for PUSCH Port Combination and Corresponding Command(s)

In an embodiment, in order to support a high mobility case (e.g. the UE with the high mobility), the port parameter and the corresponding spatial relation information may be combined into one transmission state (which may be also called as a transmission state codepoint) that is dynamically indicated for subsequent transmissions. In an embodiment, rules of combining the port parameter and the corresponding spatial relation information into the transmission state may need to consider an antenna switching method of the UE (e.g. intra-panel switching, partial inter-panel switching, or full inter-panel switching).

Figure 5:
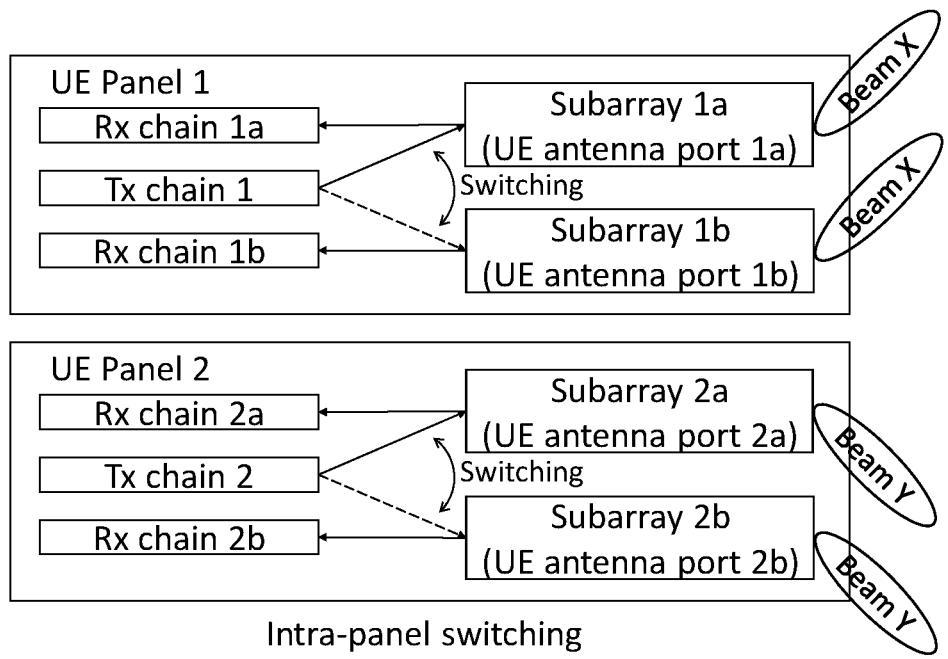
FIG. 5 shows a schematic diagram of a user equipment with 2 transmission chains and 4 reception chains according to an embodiment of the present disclosure.

FIG. 5 shows a schematic diagram of a UE with 2 Tx chains and 4 Rx chains (2T4R) according to an embodiment of the present disclosure. In FIG. 5, the UE adopts the intra-panel switching for the UL transmissions. More specifically, the UE has 2 antenna panels (i.e. UE panel 1 and UE panel 2) and each of the antenna panels has 1 Tx chain (i.e. Tx chain 1 or Tx chain 2), 2 Rx chains (i.e. Rx chains 1a and 1b or Rx chains 2a and 2b) and 2 subarrays (e.g. UE antenna ports) (i.e. subarrays 1a and 1b or subarrays 2a and 2b). In this embodiment, the Tx chain 1 switches to connect the subarray 1a or 1b located in the same UE panel 1. Similarly, the Tx chain 2 switches to connect the subarray 2a or 2b located in the same UE panel 2.

Figure 6:
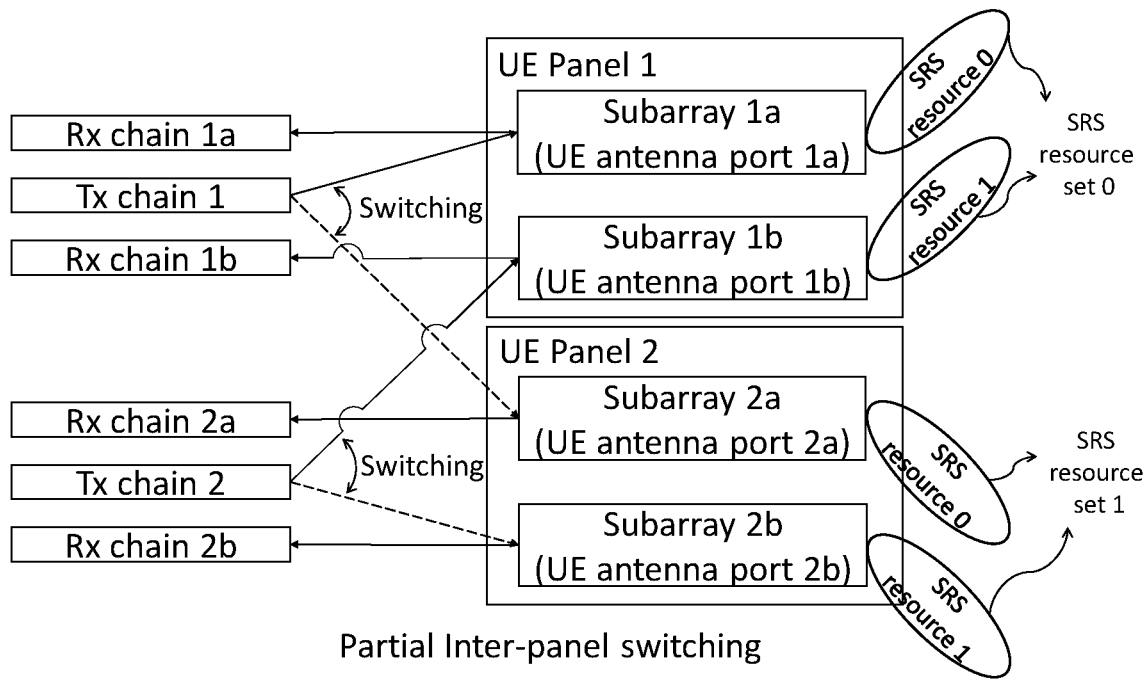
FIG. 6 shows a schematic diagram of a user equipment with 2 transmission chains and 4 reception chains according to an embodiment of the present disclosure.

FIG. 6 shows a schematic diagram of a UE with 2T4R according to an embodiment of the present disclosure. In FIG. 6, the UE uses the partial inter-panel switching for the UL transmissions. In detail, the UE has 2 antenna panels (i.e. UE panel 1 and UE panel 2) and 2 Tx chains (i.e. Tx chains 1 and 2), 4 Rx chains (i.e. Rx chains 1a, 1b, 2a and 2b), wherein each of antenna panels has 2 subarrays (UE antenna ports) (i.e. subarrays 1a and 1b or subarrays 2a and 2b). In this embodiment, the Tx chain 1 switches to connect the subarray 1a or 2b separately located in the UE panels 1 and 2. Similarly, the Tx chain 2 switches to connect the subarray 1b or 2b separately located in the UE panels 1 and 2.

Figure 7:
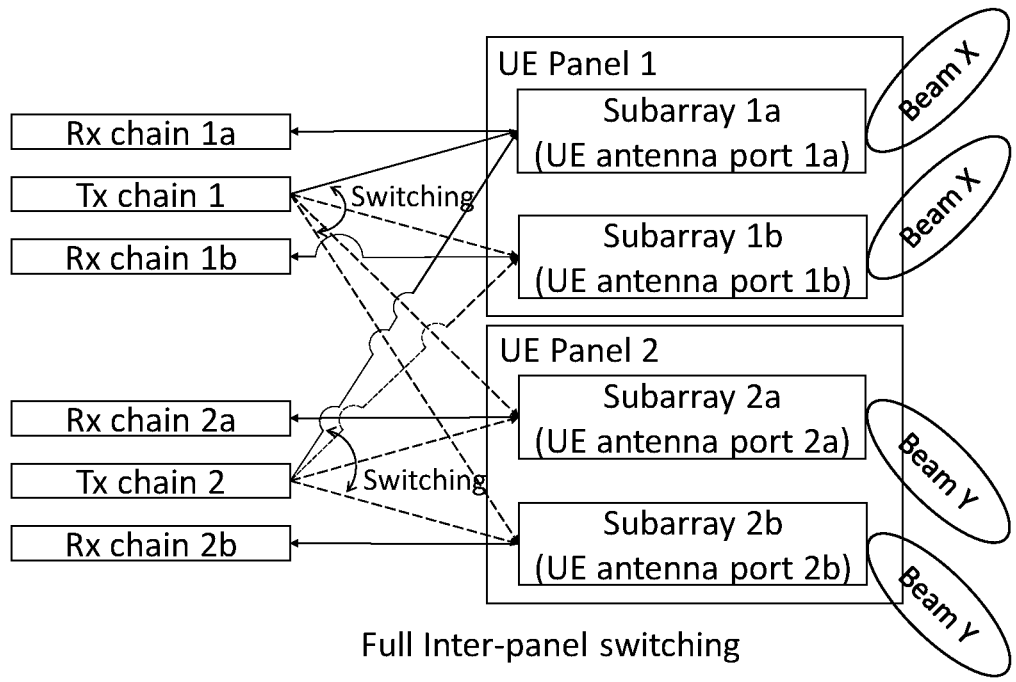
FIG. 7 shows a schematic diagram of a user equipment with 2 transmission chains and 4 reception chains according to an embodiment of the present disclosure.

FIG. 7 shows a schematic diagram of a UE with 2T4R according to an embodiment of the present disclosure. In FIG. 7, the UE uses the full inter-panel switching for the UL transmissions. In detail, the UE has 2 antenna panels (i.e. UE panel 1 and UE panel 2) and 2 Tx chains (i.e. Tx chains 1 and 2), 4 Rx chains (i.e. Rx chains 1a, 1b, 2a and 2b), wherein each of antenna panels has 2 subarrays (UE antenna ports) (i.e. subarrays 1a and 1b or subarrays 2a and 2b). In this embodiment, the Tx chain 1 switches to connect one of the subarrays 1a, 1b, 2a and 2b. That is, the Tx chain 1 is able to connect to any subarray of the UE. Similarly, the Tx chain 2 switches to connect one of the subarrays 1a, 1b, 2a and 2b.

In the following, some rules for combining the port parameter and the corresponding spatial relation information into the transmission state are illustrated. In an embodiment, at least one of the following rules is considered for the PUSCH port combination.

In an embodiment, the SRS resources within an SRS source set cannot be combined in a single transmission state. For example, when the structure of the UE adopts the intra-panel switching, the SRS resources within the same SRS source set cannot be combined in one transmission state. In an embodiment based on FIG. 5, a beam X corresponding to the subarray 1a and another beam X corresponding to the subarray 1b may be within one SRS resource set and cannot be combined in the same transmission state.

In an embodiment, the SRS resources from different SRS resource sets may be combined in a transmission state. For instance, when the structure of the UE adopts the intra-panel switching, the SRS resources from different SRS resource sets may be combined in one transmission state. In an embodiment based on FIG. 5, a beam X corresponding to the subarray 1a and a beam Y corresponding to the subarray 2a may be within different SRS resource sets and may be combined in one transmission state.

In an embodiment, the number of the SRS ports and/or the SRS resources and/or DL RS resources combined in a single transmission state cannot be beyond the UE capability or a threshold. For example, when the structure of the UE adopts the inter-panel switching (e.g. full inter-panel switching), the number of the SRS ports and/or the SRS resources and/or the DL RS resources comprised by a single transmission state is not greater than the UE capability or the threshold.

In an embodiment, the threshold is predefined.

In an embodiment, the threshold is determined based on the UE capability.

In an embodiment, the SRS resources with different indexes may be combined in a transmission state. In other words, it is precluded that different SRS resources with same indexes (e.g., from different SRS resource sets) is combined in a transmission state. For example, when the UE structure uses the inter-panel switching (e.g. partial inter-panel switching), the SRS resources with different indexes may be combined in one transmission state. In an embodiment based on FIG. 6, an SRS resource 0 corresponding to the subarray 1a and an SRS resource 1 corresponding to the subarray 1b may be combined in an SRS resource set 0 and an SRS resource 0 corresponding to the subarray 2a and an SRS resource 2 corresponding to the subarray 2b are combined in another SRS resource set 1. Under such conditions, the SRS resource 0 corresponding to the subarray 1a and the SRS resource 0 corresponding to the subarray 2a (i.e. the SRS resources with the same indexes) cannot be combined into one transmission state. Similarly, the SRS resource 1 corresponding to the subarray 1b and the SRS resource 1 corresponding to the subarray 2b cannot be combined into one transmission state. In other words, the SRS resources with different indexes (e.g. the SRS resource 0 corresponding to the subarray 1a and the SRS resource 1 corresponding to the subarray 1b) may be combined into one transmission state.

In an embodiment, the SRS resources with same indexes may be combined in a transmission state. In other words, it is precluded that different SRS resources with different indexes (e.g., from different SRS resource sets) is combined in a transmission state. In an embodiment, the only difference from FIG. 6 is that an SRS resource 0 corresponding to the subarray 2b and an SRS resource 1 corresponding to the subarray 2a are combined in another SRS resource set 1. Consequently, under such conditions, the SRS resource 0 corresponding to the subarray 1a and the SRS resource 1 corresponding to the subarray 2a (i.e. the SRS resources with the different indexes) cannot be combined into one transmission state. Similarly, the SRS resource 1 corresponding to the subarray 1b and the SRS resource 0 corresponding to the subarray 2b cannot be combined into one transmission state. In other words, the SRS resources with same indexes (e.g. the SRS resource 0 corresponding to the subarray 1a and the SRS resource 0 corresponding to the subarray 1b) may be combined into one transmission state.

In an embodiment, at least one DL RS may be combined in one transmission state. In an embodiment, one out of the at least one DL RS in the transmission state corresponds to a single PUSCH antenna port. In an embodiment, one out of the at least one DL RS corresponds to a PUSCH antenna port and/or an antenna port group.

In an embodiment, the PUSCH antenna port(s) may be associated with at least one of the SRS resource, the SRS port and/or the DL RS (i.e. at least one SRS resource and/or at least one SRS port, and/or at least one DL RS), which is indicated by the transmission state and/or the SRI. In an embodiment, the at least one DL RS is configured in at least one TCI state and the at least one TCI state is associated with the PUSCH antenna port(s).

In an embodiment, the SRS resource(s) may be associated with a transmission state which is used for determining the spatial relation. For example, the transmission state is applied for the PUSCH transmission and the PUSCH antenna port(s) of the PUSCH transmission is determined according to the SRS resource(s) associated with the transmission state.

In an embodiment, the SRI codepoint may be used for indicating the SRS resource(s) which is available for the PUSCH transmissions. In other words, the antenna port(s) of the SRS resource(s) are mapped to the PUSCH antenna port(s).

In an embodiment, the TPMI codepoint may be used to indicate precoding information for the antenna ports corresponding to the SRS resource(s) indicated by the transmission state.

In an embodiment, a new command (e.g., a MAC-CE or an RRC signaling) may be introduced to combine candidates of the SRS resource(s) and/or the SRS port(s) and/or the DL RS(s) (and/or the TCI state(s)) for a transmission state. In the following, various examples of the command of combining the candidates of the SRS resource(s) and/or the SRS port(s) and/or the DL RS(s) (and/or the TCI state(s)) for the transmission state are illustrated.

Example-1: Based on the command of this embodiment, one or more SRS resources and the corresponding SRS resource sets are provided for one transmission state. In an embodiment, the command is the MAC-CE, there are two SRS resource sets (each of which has 2 SRS resources) related to two separate UE panels and the MAC-CE based combination is shown in the following Table I. In this embodiment, in order to keep the overhead of the MAC-CE command the same, indexes of the SRS resources are the local ID in the corresponding SRS resource set. In the embodiment shown in Table I, there are four UE antenna ports (i.e. UE antenna port 1a/1b/2a/2b) and each of the UE antenna ports corresponds to at least one of an SRS resource 0 in an SRS resource set 0 (i.e. Resouce-0_Set-0), an SRS resource 1 in the SRS resource set 0 (i.e. Resouce-1_Set-0), an SRS resource 0 in an SRS resource set 1 (i.e. Resouce-0_Set-1), an SRS resource 1 in the SRS resource set 1 (i.e. Resouce-1_Set-1), respectively. For example, the UE antenna ports 1a, 1b, 2a and 2b may be those shown in FIG. 5, 6 or 7. Based on Table I, transmission states (i.e. codepoints in the DL control information (DCI)) 000 and 001 are used for single layer PUSCH transmissions. In addition, transmission states 010, 011, 100 and 101 are used for two layers PUSCH transmissions. In an embodiment, the length of the TPMI or the SRI field in the DCI is determined according to the maximum number of SRS resources in single transmission state, e.g. to support the flexibility/dynamic indication of single or multiple transmission layers.

TABLE I

SRS resource wise PUSCH port combination by MAC-CE command

| Transmission state as a codepoint in DCI | Parameter provided by MAC-CE (i.e., SRS resource wise) | Note: UE antenna port combination for PUSCH |
|---|---|---|
| 000 | Resource-0_Set-0 | UE antenna port 1a |
| 001 | Resource-0_Set-1 | UE antenna port 2a |
| 010 | Resource-0_Set-0 & Resource-1_Set-0 | UE antenna port 1a & UE antenna port 1b |
| 011 | Resource-0_Set-0 & Resource-1_Set-1 | UE antenna port 1a & UE antenna port 2b |
| 100 | Resource-0_Set-1 & Resource-1_Set-0 | UE antenna port 2a & UE antenna port 1b |
| 101 | Resource-0_Set-1 & Resource-1_Set-1 | UE antenna port 2a & UE antenna port 2b |

Example-2: In this embodiment, an SRS-port-wise combination is provided. In this embodiment, there are 2 SRS resources in one SRS resource set and there are two SRS ports for each of the SRS resources. In an embodiment, the SRS ports corresponding to a single SRS resource may be used for the UL transmissions simultaneously. The following Table II shows the SRS-port-wise PUSCH port combination based on the (MAC-CE) command. In Table II, there are two SRS resources 0 and 1 (i.e. resource-0 and resource-1), two SRS ports 0 and 1 (i.e. port-0 and port-1) for each of SRS resources 0 and 1, and 4 UE antenna ports 1a, 1b, 2a and 2b (e.g. those shown in any of FIGS. 5 to 7). Based on Table II, the transmission state (i.e. codepoints in the DL control information (DCI)) 000 corresponds to the SRS resource 0 with the SRS port 0 and the UE antenna port 1a, the transmission state 001 corresponds to the SRS resource 1 with the SRS port 0 and the UE antenna port 2a, and so on. In an embodiment, the length of the TPMI or the SRI field in the DCI is determined according to the maximum number of ports for single transmission state, in order to support the flexibility/dynamic indication of single or multiple transmission layers.

TABLE II

SRS port wise PUSCH port combination by MAC-CE command

| Transmission state as a codepoint in DCI | Parameter provided by MAC-CE (i.e., SRS port wise) | Note: UE antenna port combination for PUSCH |
|---|---|---|
| 000 | Port-0_Resource-0 | UE antenna port 1a |
| 001 | Port-0_Resource-1 | UE antenna port 2a |
| 010 | Port0_Resource-0 & Port1_Resource-0 | UE antenna port 1a & UE antenna port 1b |
| 011 | Port0_Resource-0 & Port1_Resource-1 | UE antenna port 1a & UE antenna port 2b |
| 100 | Port0_Resource-1 & Port1 Resource-0 | UE antenna port 2a & UE antenna port 1b |
| 101 | Port0_Resource-1 & Port1_Resource-1 | UE antenna port 2a & UE antenna port 2b |

Example-3: In this embodiment, a DL-RS/TCI-state-wise combination is provided. More specifically, at least one DL RS/TCI state may be provided for single transmission state. In an embodiment of providing the at least one TCI state for single transmission state, the DL RS regarding (e.g. associated with) the QCL Type-D is used for determining the PUSCH transmission. The corresponding examples for the DL-RS wise or the TCI state-wise are shown in the following Table III and Table IV, respectively.

In the embodiment of Table III, there are two DL RSs (i.e. DL RS-0 and DL RS-1) and 4 UE antenna ports 1a, 1b, 2a and 2b (e.g. those shown in one of FIGS. 4 to 6). In this embodiment, a single transmission state is associated with at least one DL RS. For example, the transmission state (i.e. codepoint in the DCI) 000 is associated with the DL RS-0, the transmission state (i.e. codepoint in the DCI) 001 is associated with the DL RS-1, and so on.

TABLE III

DL RS wise PUSCH port combination by MAC-CE command

| Transmission state as a codepoint in DCI | Parameter provided by MAC-CE (i.e., DL-RS state wise) | Note: UE antenna port combination for PUSCH |
|---|---|---|
| 000 | DL RS-0 | UE antenna port 1a |
| 001 | DL RS-1 | UE antenna port 2a |
| 010 | {DL RS-0, DL RS-0} | UE antenna port 1a & UE antenna port 1b |
| 011 | {DL RS-0, DL RS-1} | UE antenna port 1a & UE antenna port 2b |
| 100 | {DL RS-1, DL RS-0} | UE antenna port 2a & UE antenna port 1b |
| 101 | {DL RS-1, DL RS-1} | UE antenna port 2a & UE antenna port 2b |

In the embodiment of Table IV, there are two TCI states (i.e. TCI state-0 and TCI state-1) and 4 UE antenna ports 1*a*, 1*b*, 2*a* and 2*b* (e.g. those shown in one of FIGS. 4 to 6). In this embodiment, single transmission state is associated with at least one TCI state. For example, the transmission state (i.e. codepoint in the DCI) 000 is associated with the TCI state-0, the transmission state (i.e. codepoint in the DCI) 001 is associated with the TCI state-1, and so on.

TABLE IV

TCI state wise PUSCH port combination by MAC-CE command

| Transmission state as a codepoint in DCI | Parameter provided by MAC-CE (i.e., TCI state wise) | Note: UE antenna port combination for PUSCH |
|---|---|---|
| 000 | TCI state-0 | UE antenna port 1a |
| 001 | TCI state-1 | UE antenna port 2a |
| 010 | {TCI state-0, TCI state-0} | UE antenna port 1a & UE antenna port 1b |
| 011 | {TCI state-0, TCI state-1} | UE antenna port 1a & UE antenna port 2b |
| 100 | {TCI state-1, TCI state-0} | UE antenna port 2a & UE antenna port 1b |
| 101 | {TCI state-1, TCI state-1} | UE antenna port 2a & UE antenna port 2b |

Embodiment 3: Detailed Criteria for SRS Combination in PUSCH Transmission

In order to reduce a preamble overhead, a single SRS resource may be used for multiple usages, e.g., for the PUSCH codebook transmissions, the PUSCH non-codebook transmissions, and/or the antenna switching. In an embodiment, at least one of the following criteria for the SRS resource is supported, to satisfy restrictions related to the UE capability.

In an embodiment of the UE with the intra-panel switching (e.g. FIG. 5), at least one of the following criteria is supported:
- A) Different SRS antenna ports or SRS resources within a single UE panel, and/or the SRS resource or the SRS resource set cannot be transmitted simultaneously;
- B) Different SRS antenna ports or SRS resources from different panels, SRS resources or SRS resource sets can be transmitted simultaneously; and
- C) The mapping between the Tx chain(s) and the UE panel(s) is fixed.

In an embodiment of the UE supporting the partial inter-panel switching (e.g. FIG. 6), at least one of the following criteria is supported:
- A) Different SRS antenna ports or SRS resources may be transmitted simultaneously, regardless that the SRS antenna ports or SRS resources from the same or different panels, SRS resources or SRS resource sets;
- B) No more than N antenna ports or SRS resources can be transmitted simultaneously, wherein N is a positive integer;
- B-1) The different SRS resources with same resource index can be transmitted simultaneously;
- B-2) The different SRS resources with different resource indexes cannot be transmitted simultaneously;
- B-3) The different SRS ports with the same port index can be transmitted simultaneously;
- B-4) The different SRS ports with different port indexes cannot be transmitted simultaneously;
- C) The UE of the partial inter-panel switching may support the dynamic panel-wise switching, considering that the mapping between the Tx chain(s) and the panel(s) is controllable.

In an embodiment of the UE supporting the full inter-panel switching (e.g. FIG. 7), at least one of the following criteria is supported:
- A) Different SRS antenna ports or SRS resources can be transmitted simultaneously, regardless that the SRS antenna ports or SRS resources from the same or different panel(s), SRS resource(s) or SRS resource set(s);
- B) No more than N antenna ports or resources can be transmitted simultaneously (where N is a positive integer).
- C) The UE supporting the full inter-panel switching may support the dynamic panel-wise switching, when considering the mapping between the Tx chain(s) and the panel(s) is controllable.
- C-1) Simultaneous transmission across different panels/ spatial relations/TCIs may be determined based on the UE capability.

Embodiment 4: Transmission Mode for UE Fast Panel Switching

When a UE panel is switched to the active mode from the idle mode, there is an additional latency (e.g. about 3 ms). During this switching period, the UE cannot perform any UL transmission due to an uncertainty of physical circuits. Consequently, a transmission gap for precluding all UL transmission may need to be specified.

In an embodiment, when the UE performs a UL transmission in a first transmission mode and there is a preceding UL transmission corresponds to a second transmission mode, the UE is not expected to transmit for a duration of a time gap. Furthermore, any UL or DL transmission during the duration of the time gap may be omitted by the UE.

In an embodiment, the transmission mode is determined according to at least one of the panel, the transmission state and the number of antenna ports.

In an embodiment, the first and second transmission modes are different at at least one of the panels, the transmission state and the number of antenna ports, panels.

In an embodiment, the number or the maximum number of ports corresponding to single transmission state is determined according to the transmission mode.

In an embodiment, the transmission mode may be configurable by the network.

In an embodiment, the duration of the time gap, the maximum number of ports in a UL transmission, the maximum number of ports for a transmission state is determined based on the UE capability or a specific value. In an embodiment of applying multiple transmission states for a UL transmission, the maximum number of ports for single transmission state is determined based on the UE capability or the specific value. In an embodiment of applying single transmission state for single UL transmission, the maximum number of ports for a transmission state is determined based on the UE capability or the specific value.

Figure 8:
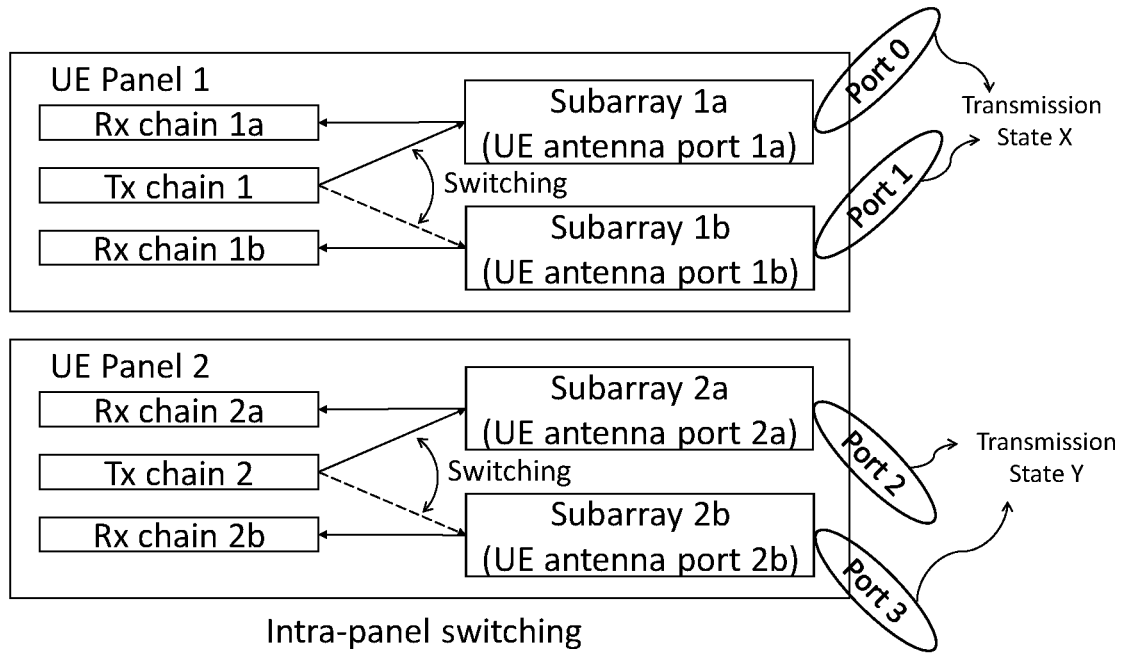
FIG. 8 shows a schematic diagram of a user equipment supporting an intra-panel switching according to an embodiment of the present disclosure.

In an embodiment, at least one of the following transmission modes may be provided for the UE supporting the intra-panel switching. In this embodiment, the UE supporting the intra-panel switching may support 2 panels as shown in FIG. 8. In FIG. 8, the UE has 2T4R (i.e. 2 Tx chains 0 and 1 and 4 Rx chains 1a, 1b, 2a and 2b) and 2 panels (i.e. UE panels 1 and 2), wherein each of panels has 1 Tx chain, 2 Rx chains and 2 subarrays (e.g. subarrays 1a and 1b or subarrays 2a and 2b).

Mode 1: Two Panels, or Two Transmission States

In an embodiment of the mode 1, the single port transmission corresponds to one of two panel/transmission states.

Mode 2: One Panel, or One Transmission State

In an embodiment of the mode 2, up to one port transmission is supported.

Mode 3: Another Panel, or Another Transmission State

In an embodiment of the mode 3, up to one port transmission is supported.

In an embodiment, the number of Tx chains and the number of antenna ports for the UL transmissions in the modes 1, 2, and 3 can be found in the following Table V.

TABLE V

Candidate modes in intra-panel switching for UL transmission

| | Number of Tx chains (panel 1 + panel 2) | Number of antenna ports for UL transmission (panel 1 + panel 2) |
|---|---|---|
| Mode 1 | 1T + 1T | 1P + 0P, 1P + 1P, 0P + 1P |
| Mode 2 | 0T + 1T | 0P + 1P |
| Mode 3 | 1T + 0T | 1P + 0P |

Figure 9:
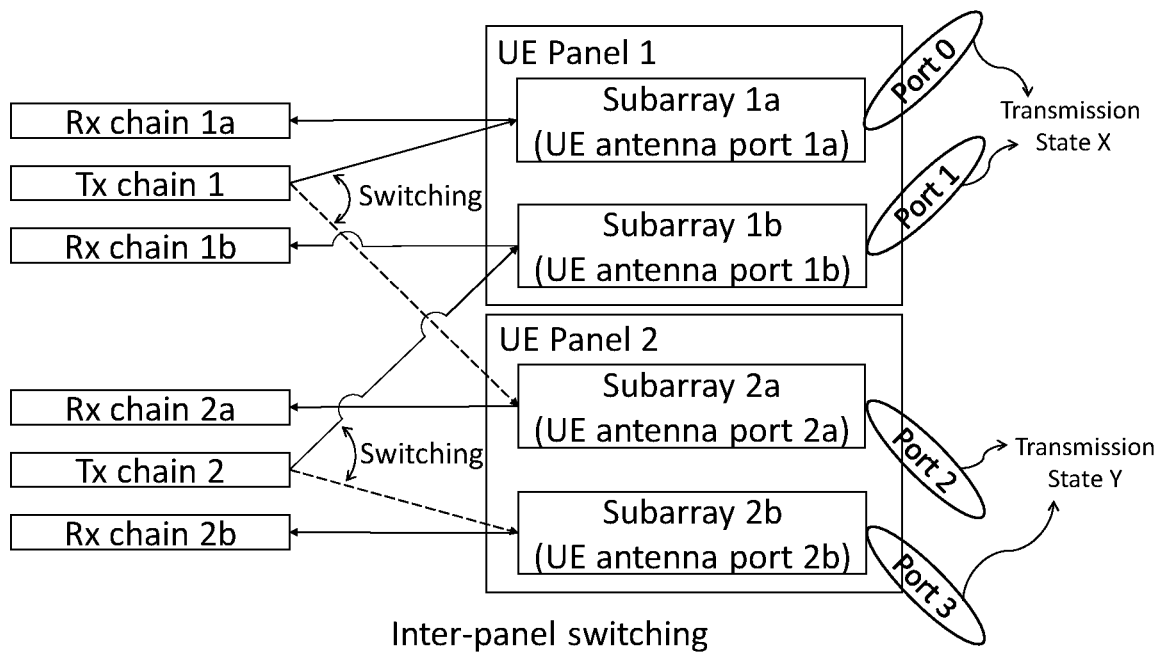
FIG. 9 shows a schematic diagram of a user equipment supporting an inter-panel switching according to an embodiment of the present disclosure.

In an embodiment, at least one of the following transmission modes may be provided for the UE supporting the inter-panel switching (e.g. partial inter-panel switching). In this embodiment, the UE supporting the inter-panel switching may support 2 panels as shown in FIG. 9. In FIG. 9, the UE has 2T4R (i.e. 2 Tx chains 0 and 1 and 4 Rx chains 1a, 1b, 2a and 2b) and 2 panels (i.e. UE panels 1 and 2), wherein each of panels has 2 subarrays (e.g. subarrays 1a and 1b or subarrays 2a and 2b).

Mode 1: Two Panels or Two Transmission States

In an embodiment of the mode 1, the single port transmission corresponds to one of two panel/transmission states.

Mode 2: One Panel or One Transmission State

In an embodiment of the mode 2, up to two port transmission is supported

Mode 3: Another Panel, or Another Transmission State

In an embodiment of the mode 3, up to two port transmission is supported.

In an embodiment, the number of Tx chains and the number of antenna ports for the UL transmissions in these three transmission modes may be summarized into Table VI.

TABLE VI

Candidate transmission modes in inter-panel switching UE for UL transmission

| | Number of Tx chains (panel 1 + panel 2) | Number of antenna ports for UL transmission (panel 1 + panel 2) |
|---|---|---|
| Mode 1 | 1T + 1T | 1P + 0P, 1P + 1P, 0P + 1P |
| Mode 2 | 0T + 2T | 0P + 2P, 0P + 1P |
| Mode 3 | 2T + 0T | 2P + 0P, 1P + 0P |

Embodiment 5: Additional Rules for Heterogeneous UE Panel Structure

Figures 10, 11:
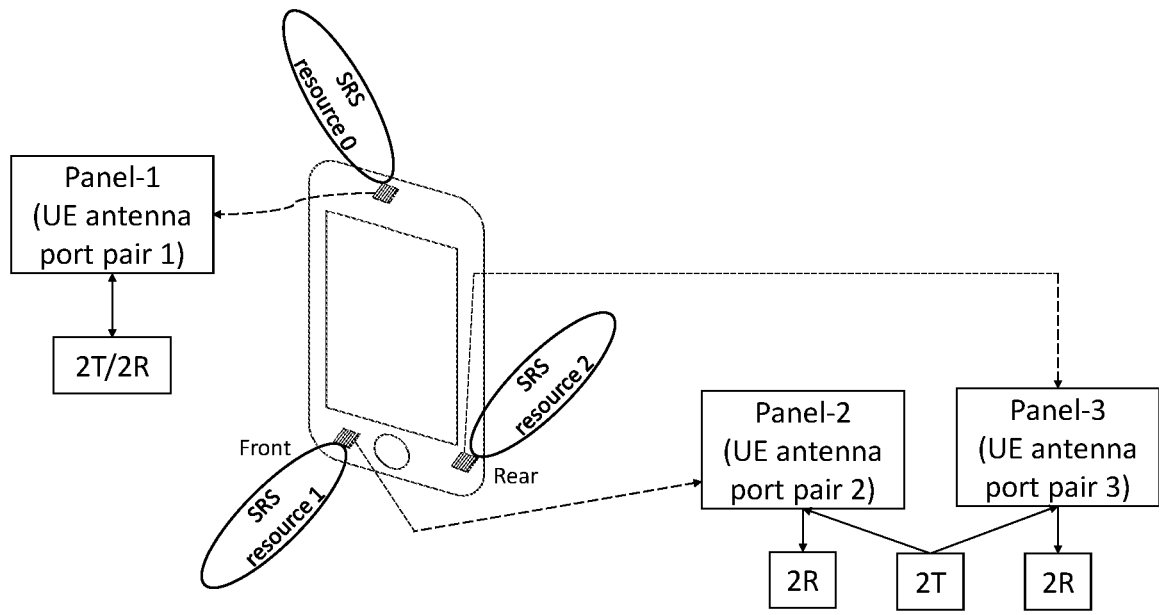
FIG. 10 shows a schematic diagram of a user equipment with 4 transmission chains and 6 reception chains according to an embodiment of the present disclosure.
FIG. 11 shows a flowchart of a process according to an embodiment of the present disclosure.

In an embodiment, the UE complexity of panel switching may be simplified into the partial UE panel switching, which can be seen as a particular case of the inter-panel switching for the UL transmissions. In this embodiment, 4T6R UE antenna switching is considered. FIG. 10 shows a schematic diagram of the 4T6R UE according to an embodiment of the present disclosure. In FIG. 10, a panel-1 (e.g. a UE antenna port pair 1) on the top of the UE has a fixed Tx/Rx antenna panel pair 1 (e.g. comprising 2T/2R). In addition, the Tx antenna switching may be performed between a panel-2 (a UE antenna port pair 2) facing a front direction of the UE and a panel-3 (a UE antenna port pair 3) facing a rear direction are shared.

In an embodiment of a sounding procedure, there are multiple groups of SRS resources for the sounding procedure. As an alternative or in addition, up to one SRS resource from separate N groups and up to M SRS resource(s) from separate M groups may be transmitted simultaneously or may be combined for a transmission state, wherein N and M are positive integers.

For example, at least one of following rules can be configured.

In an embodiment, one SRS resource set comprises 3 SRS resources. and there is a gap between only 2 given resources that cannot be combined for UL transmission or cannot be transmitted simultaneously.

In an embodiment of two SRS resource sets, there are two SRS resources in one SRS resource set and there is only one SRS resource in another SRS resource set.

FIG. 11 shows a flowchart of a process according to an embodiment of the present disclosure. The process shown in FIG. 11 may be used in a wireless terminal (e.g. UE) and comprises the following steps:

Step 1100: Determine at least one transmission state for an uplink channel, wherein at least one of a spatial relation or an antenna port of the uplink channel is determined based on a first transmission state of the at least one transmission state.

Step 1101: Transmit, to a wireless network node, the uplink channel.

In the process shown in FIG. 11, the wireless terminal determines at least one transmission state for a UL channel, wherein at least one of a spatial relation or an antenna port of the UL channel is determined based on a first transmission state of the at least one transmission state. In an embodiment, at least one spatial relation and/or at least one antenna port is determined based on the first transmission state. Based on the determined spatial relation(s) and/or antenna port(s), the UE transmits the UL channel to a wireless network node (e.g. BS or gNB).

In an embodiment, the wireless terminal may receive a command associated with the at least one transmission state from the wireless network node.

In an embodiment, one of the at least one transmission state is associated with one or more RSs (e.g. at least one RS), and wherein the at least one of the spatial relation or the antenna port of the UL channel is determined based on one of the one or more reference signals associated with the first transmission state.

In an embodiment, the at least one transmission state is associated with one or more reference signals. In this embodiment, the wireless terminal further determines at least one of the one or more reference signals associated with the first transmission state for the UL channel, wherein the at least one of the spatial relation or the antenna port of the UL channel is determined further based on one of the determined at least one reference signal.

In an embodiment, the at least one transmission state is associated with one or more DL RSs, and wherein a pathloss reference signal is determined based on at least one of the one or more DL RSs.

In an embodiment, the at least one of the one or more DL RSs relates to at least one spatial parameter (e.g. the QCL type D parameter).

In an embodiment, the at least one of the one or more DL RSs corresponds to at least one of: the DL RS resource with the lowest or the highest resource identification in the at least one transmission state, or the DL RS resource as (e.g. with) the first entry in the at least one transmission state.

In an embodiment, a pathloss estimation is determined based on an average value of one or more pathloss estimations corresponding to the one or more DL RSs.

In an embodiment, the one or more reference signals associated with the at least one transmission state comprise at least one of a DL RS resource, a DL RS port, a SRS resource or an SRS port. For example, the one or more reference signals may comprise at least one DL RS resource, and/or at least one DL RS port and/or at least one SRS resource and/or at least one SRS port.

In an embodiment, one of the at least one transmission state comprises at least one of a TCI state or a spatial relation. For example, each of the at least one transmission state may comprise (or be associated with) at least one TCI state and/or a spatial relation In an embodiment, one of the at least one transmission state is associated with at least one panel, at least one SRS resource or at least one SRS port.

In an embodiment, the SRS resources in one of the at least one transmission state are not within the same SRS resource set or are within separate SRS resource sets.

In an embodiment, the SRS resources in one of the at least one transmission state are not within the same SRS resource set or are within separate SRS resource sets.

In an embodiment, the number of SRS resources, SRS ports or DL RS resources in one of the at least one transmission state is smaller than or equal to a capability of the wireless terminal or a threshold.

In an embodiment, the SRS resources or the SRS ports in one of the at least one transmission state have the same indexes or do not have different indexes.

In an embodiment, the SRS resources or the SRS ports in one of the at least one transmission state have different indexes or do not have the same indexes.

In an embodiment, the wireless terminal may receive, from the wireless network node, a command indicating the at least one of the DL RS resources, the DL RS ports, the TCI states, the SRS resources or the SRS ports associated with one of the at least one transmission state.

In an embodiment, the wireless terminal may receive, from the wireless network node, DCI indicating (e.g. comprising) the first transmission state of the at least one transmission state. In this embodiment, a length of at least one of a transmitted precoding matrix indicator field or a SRS resource indicator field in the DCI is determined based on the maximum number of one of the DL RS resources, the DL RS ports, the transmission configuration indicator states, the SRS resources or the SRS ports associated with the first transmission state.

In an embodiment, the wireless terminal may receive, from the wireless network node, DCI indicating the at least one transmission state. In this embodiment, Q spatial relation(s), P antenna port(s), T antenna port group(s) of the UL channel are determined based on a corresponding transmission state of the at least one transmission state in order, wherein Q, P, and T are positive integers.

In an embodiment, a length of at least one of a TPMI field or a SRS resource indicator field in the DCI is determined based on the maximum number of one of the DL RS resources, the DL RS ports, the TCI states, transmission states, the SRS resources or the SRS ports associated with the at least one transmission state.

In an embodiment, the wireless terminal may receive, from the wireless network node, a TPMI in DCI, wherein the TPMI indicates precoding information of the at least one antenna port associated with the first transmission state.

In an embodiment, the one or more RSs associated with the at least one transmission state comprise at least one SRS resource which is grouped into a plurality of SRS resource sets.

In an embodiment, wherein at most X SRS resources of Y first SRS resource sets in the plurality of SRS resource sets and at most M SRS resources of N second SRS resource sets in the plurality of SRS resource sets are comprised in one of the at least one transmission state, wherein X, Y, M and N are positive integers. In an embodiment, X=1.

In an embodiment, at most X SRS resources of Y first SRS resource sets in the plurality of SRS resource sets and at most M SRS resources of N second SRS resource sets in the plurality of SRS resource sets are transmitted simultaneously, wherein X, Y, M and N are positive integers. In an embodiment, X=1.

In an embodiment, the Y first SRS resource groups are associated with at least one antenna port shared by a plurality of Tx chains and the N second SRS resource groups are associated with at least one antenna port shared by another plurality of Tx chains. For example, in FIG. 10, the Y first SRS resource groups may be associated with the panel-2 and panel-3 shared by two Tx chains and the N second SRS resource groups are associated with the panel-1 shared by another two Tx chains.

Figure 12:
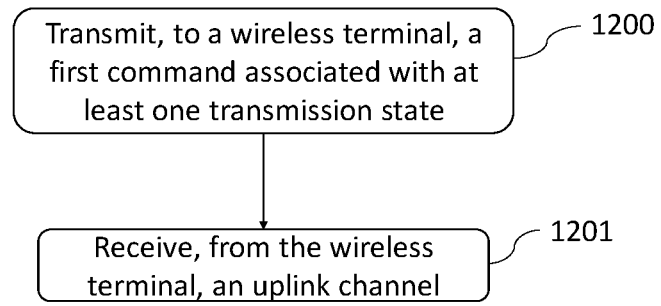
FIG. 12 shows a flowchart of a process according to an embodiment of the present disclosure.

FIG. 12 shows a flowchart of a process according to an embodiment of the present disclosure. The process shown in FIG. 12 may be used in a wireless network node (e.g. BS) and comprises the following steps:

Step 1200: Transmit, to a wireless terminal, a first command associated with at least one transmission state.

Step 1201: Receive, from the wireless terminal, an uplink channel.

In the process shown in FIG. 12, the wireless network node may transmit a first command associated with at least one transmission state to a wireless terminal (e.g. UE) and receive a UL channel from the wireless terminal. Note that, at least one of a spatial relation or an antenna port of the UL channel is determined based on a first transmission state of the at least one transmission state.

In an embodiment, one of the at least one transmission state is associated with one or more reference signals, and wherein the at least one of the spatial relation or the antenna port of the UL channel is determined based on one of the one or more reference signals associated with the first transmission state.

In an embodiment, the at least one transmission state is associated with one or more reference signals. In this embodiment, the first command further indicates at least one of the one or more reference signals associated with the first transmission state. In addition, the at least one of the spatial relation or the antenna port of the UL channel is determined further based on one of the indicated at least one reference signal.

In an embodiment, the at least one transmission state is associated with one or more DL RSs, and wherein a pathloss reference signal is determined based on at least one of the one or more DL RSs.

In an embodiment, the at least one of the one or more DL RSs relates to at least one spatial parameter.

In an embodiment, the at least one of the one or more DL RSs corresponds to at least one of: the DL RS resource with the lowest or the highest resource identification in the at least one transmission state, or the DL RS resource as the first entry in the at least one transmission state.

In an embodiment, a pathloss estimation is determined based on an average value of one or more pathloss estimations corresponding to the one or more DL RSs.

In an embodiment, the one or more reference signals associated with the at least one transmission state comprise at least one of a DL RS resource, a DL RS port, a SRS resource or an SRS port.

In an embodiment, the SRS resources in one of the at least one transmission state are not within the same SRS resource set or are within separate SRS resource sets.

In an embodiment, the number of SRS resources, SRS ports or DL RS resources in one of the at least one transmission state is smaller than or equal to a capability of the wireless terminal or a threshold.

In an embodiment, the SRS resources or the SRS ports in one of the at least one transmission state have different indexes or do not have the same indexes.

In an embodiment, the SRS resources or the SRS ports in one of the at least one transmission state have the same indexes or do not have different indexes.

In an embodiment, the wireless network node transmits, to the wireless terminal, a second command indicating the at least one of the DL RS resources, the DL RS ports, the transmission configuration indicator states, the SRS resources or the SRS ports associated with one of the at least one transmission state.

In an embodiment, the wireless network node transmits, to the wireless terminal, DLI indicating the first transmission state of the at least one transmission state. In this embodiment, a length of at least one of a transmitted precoding matrix indicator field or a SRS resource indicator field in the DLI is determined based on the maximum number of one of the DL RS resources, the DL RS ports, the transmission configuration indicator states, the SRS resources or the SRS ports associated with the first transmission state.

In an embodiment, the wireless network node transmits, to the wireless terminal, DLI indicating at least one transmission state, wherein Q spatial relation(s), P antenna port(s), T antenna port group(s) of the UL channel are determined based on a corresponding transmission state of the at least one transmission state in order, wherein Q, P, and T are positive integers.

In an embodiment, a length of at least one of a transmitted precoding matrix indicator field or a SRS resource indicator field in the DLI is determined based on the maximum number of one of the DL RS resources, the DL RS ports, the transmission configuration indicator states, transmission states, the SRS resources or the SRS ports associated with the at least one transmission state.

In an embodiment, the wireless network node transmits, to the wireless terminal, a transmitted precoding matrix indicator in DLI indicating precoding information of the at least one antenna port associated with the first transmission state.

In an embodiment, the one or more reference signals associated with the at least one transmission state comprise at least one SRS resource which is grouped into a plurality of SRS resource sets.

In an embodiment, at most X SRS resources of Y first SRS resource sets in the plurality of SRS resource sets and at most M SRS resources of N second SRS resource sets in the plurality of SRS resource sets are comprised in one of the at least one transmission state, wherein X, Y, M and N are positive integers.

In an embodiment, at most X SRS resources of Y first SRS resource sets in the plurality of SRS resource sets and at most M SRS resources of N second SRS resource sets in the plurality of SRS resource sets are transmitted simultaneously, wherein X, Y, M and N are positive integers.

In an embodiment, the Y first SRS resource groups are associated with at least one antenna port shared by a plurality of transmission chains and the N second SRS resource groups are associated with at least one antenna port shared by another plurality of transmission chains.

Figure 13:
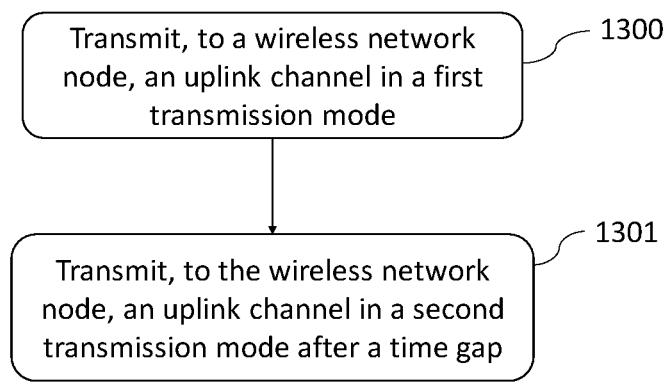
FIG. 13 shows a flowchart of a process according to an embodiment of the present disclosure.

FIG. 13 shows a flowchart of a process according to an embodiment of the present disclosure. The process shown in FIG. 13 may be used in a wireless terminal (e.g. UE) and comprises the following steps:

Step 1300: Transmit, to a wireless network node, an uplink channel in a first transmission mode.

Step 1301: Transmit, to the wireless network node, an uplink channel in a second transmission mode after a time gap.

In the process shown in FIG. 13, the wireless terminal transmits, to a wireless network node, a UL channel in a first transmission mode and transmits another UL channel in a second transmission mode after a time gap. Note that the first transmission mode and/or the second transmission mode is determined based on at least one of a panel, a transmission state or the number of antenna ports.

In an embodiment, the wireless terminal omits a UL transmission, if any, during the time gap.

In an embodiment, the first transmission mode and the second transmission mode are associated with at least one of different panels, different transmission states, different numbers of antenna ports or the number of panels. That is, the first transmission mode and the second transmission mode may be differentiated by at least one of the panel(s), the transmission state(s), the number of antenna ports or the number of panels associated with them.

In an embodiment, the first transmission mode and the second transmission mode indicate the number of antenna ports used for transmitting the UL channels.

In an embodiment, the first transmission mode and the second transmission mode are configured by the wireless network node.

In an embodiment, at least one of a duration of the time gap, the maximum number of the antenna ports or the maximum number of the antenna ports of single transmission state is determined based on a capacity of the wireless terminal or a threshold.

Figure 14:
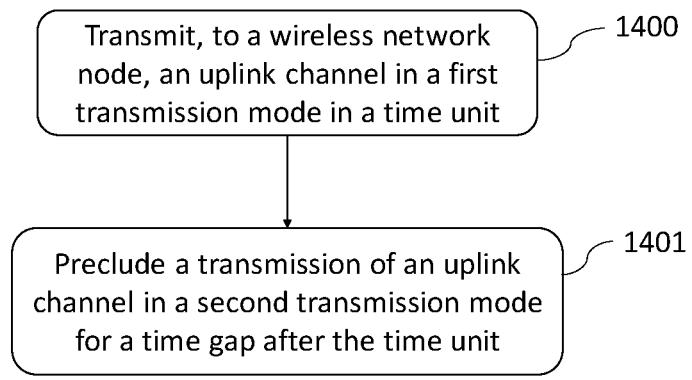
FIG. 14 shows a flowchart of a process according to an embodiment of the present disclosure.

FIG. 14 shows a flowchart of a process according to an embodiment of the present disclosure. The process shown in FIG. 14 may be used in a wireless terminal (e.g. UE) and comprises the following steps:

Step 1400: Transmit, to a wireless network node, a UL channel in a first transmission mode in a time unit Step 1401: Preclude a transmission of an uplink channel in a second transmission mode for a time gap after the time unit.

In the process shown in FIG. 14, the wireless terminal transmits a UL channel in a first transmission mode in a time unit to a wireless network node (e.g. BS). In this embodiment, for (e.g. within or in) a time gap after the time unit, the wireless terminal precludes a (e.g. any) transmission of another UL channel in a second transmission mode. Note that each of the first transmission mode and the second transmission mode is determined based on at least one of a panel, a transmission state or the number of antenna ports.

In an embodiment, the first transmission mode and the second transmission mode are associated with at least one of different panels, different transmission states, different numbers of antenna ports or the number of panels. That is, the first transmission mode and the second transmission mode may be differentiated by at least one of the panel(s), the transmission state(s), the number of antenna ports or the number of panels associated with them.

In an embodiment, the first transmission mode and the second transmission mode indicate the number of antenna ports used for transmitting the UL channels.

In an embodiment, the first transmission mode and the second transmission mode are configured by the wireless network node.

In an embodiment, at least one of a duration of the time gap, the maximum number of the antenna ports or the maximum number of the antenna ports of single transmission state is determined based on a capacity of the wireless terminal or a threshold.

Figure 15:
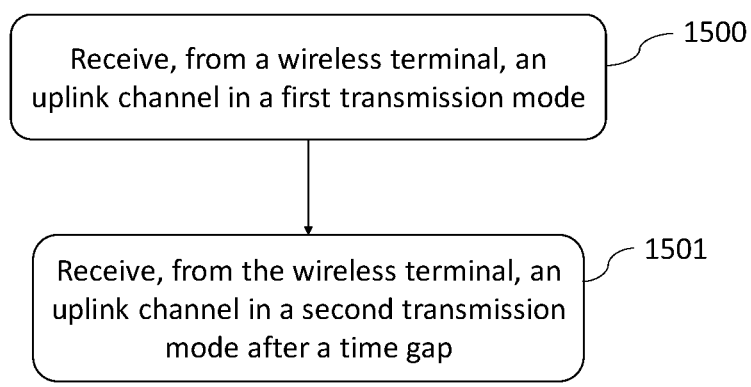
FIG. 15 shows a flowchart of a process according to an embodiment of the present disclosure.

FIG. 15 shows a flowchart of a process according to an embodiment of the present disclosure. The process shown in FIG. 15 may be used in a wireless network node (e.g. BS) and comprise the following steps:

Step 1500: Receive, from a wireless terminal, an uplink channel in a first transmission mode.

Step 1502: Receive, from the wireless terminal, an uplink channel in a second transmission mode after a time gap.

In the process shown in FIG. 15, the wireless network node may receive a UL channel in a first transmission mode from a wireless terminal (e.g. UE). In this embodiment, the wireless network node (is expect to) receives another UL channel in a second transmission mode after a time gap. That is, if the transmission mode of transmitting two consecutive UL channels changes, the time gap is expected to be between these two UL channels.

In an embodiment, each of the first transmission mode and the second transmission mode is determined based on at least one of a panel, a transmission state or the number of antenna ports.

In an embodiment, the first transmission mode and the second transmission mode are associated with at least one of different panels, different transmission states, different numbers of antenna ports or the number of panels.

In an embodiment, the first transmission mode and the second transmission mode indicate the number of antenna ports used for transmitting the UL channels.

In an embodiment, the wireless network node transmits configurations of the first transmission mode and the second transmission mode to the wireless terminal.

In an embodiment, at least one of a duration of the time gap, the maximum number of the antenna ports or the maximum number of the antenna ports of single transmission state is determined based on a capacity of the wireless terminal or a threshold.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

What is claimed is:

1. A wireless communication method for use in a wireless terminal, the wireless communication method comprising:
    determining at least one transmission state for an uplink channel, wherein a spatial relation of the uplink channel is determined based on a first transmission state of the at least one transmission state; and
    transmitting, to a wireless network node, the uplink channel,
    wherein the at least one transmission state is associated with more than one downlink reference signals,
    wherein a pathloss reference signal is determined based on at least one of the more than one downlink reference signals, and
    wherein a pathloss estimation is determined based on an average value of more than one pathloss estimations corresponding to the more than one downlink reference signals,
    wherein one of the at least one transmission state is associated with one or more reference signals, and wherein the at least one of the spatial relation of the uplink channel is determined based on one of the one or more reference signals associated with the first transmission state.

2. The wireless communication method of claim 1, wherein the at least one of the more than one downlink reference signals relates to at least one spatial parameter.

3. The wireless communication method of claim 1, wherein the at least one of the more than one downlink reference signals corresponds to at least one of: a downlink reference signal resource with the lowest or the highest resource identification in the at least one transmission state, or the downlink reference signal resource as a first entry in the at least one transmission state.

4. The wireless communication method of claim 1, wherein one or more reference signals associated with the at least one transmission state comprise at least one of a downlink reference signal resource, a downlink reference signal port, a sounding reference signal, SRS, resource or an SRS port.

5. The wireless communication method of claim 4, wherein a number of SRS resources, SRS ports or downlink reference signal resources in one of the at least one transmission state is smaller than or equal to a capability of the wireless terminal or a threshold.

6. The wireless communication method of claim 4, further comprising:
    receiving, from the wireless network node, DCI indicating the at least one transmission state, wherein Q spatial relation(s), P antenna port(s), T antenna port group(s) of the uplink channel are determined based on a corresponding transmission state of the at least one transmission state in order, wherein Q, P, and T are positive integers.

7. The wireless communication method of claim 6, wherein a length of at least one of a transmitted precoding matrix indicator field or a SRS resource indicator field in the DCI is determined based on the maximum number of one of the downlink reference signal resources, the downlink reference signal ports, the transmission configuration indicator states, transmission states, the SRS resources or the SRS ports associated with the at least one transmission state.

8. A wireless terminal comprising:
a processor; and
a transceiver configured to:
determine at least one transmission state for an uplink channel, wherein a spatial relation of the uplink channel is determined based on a first transmission state of the at least one transmission state, and
transmit, to a wireless network node, the uplink channel,
wherein the at least one transmission state is associated with more than one downlink reference signals,
wherein a pathloss reference signal is determined based on at least one of the more than one downlink reference signals, and
wherein a pathloss estimation is determined based on an average value of more than one pathloss estimations corresponding to the more than one downlink reference signals,
wherein one of the at least one transmission state is associated with one or more reference signals, and wherein the at least one of the spatial relation of the uplink channel is determined based on one of the one or more reference signals associated with the first transmission state.

9. The wireless terminal of claim 8, wherein the at least one of the more than one downlink reference signals relates to at least one spatial parameter.

10. The wireless terminal of claim 8, wherein the at least one of the more than one downlink reference signals corresponds to at least one of: a downlink reference signal resource with the lowest or the highest resource identification in the at least one transmission state, or the downlink reference signal resource as a first entry in the at least one transmission state.

11. The wireless terminal of claim 8, wherein one or more reference signals associated with the at least one transmission state comprise at least one of a downlink reference signal resource, a downlink reference signal port, a sounding reference signal, SRS, resource or an SRS port.

12. The wireless terminal of claim 11, wherein a number of SRS resources, SRS ports or downlink reference signal resources in one of the at least one transmission state is smaller than or equal to a capability of the wireless terminal or a threshold.

13. The wireless terminal of claim 11, wherein the processor is further configured to:
receive, from the wireless network node, DCI indicating the at least one transmission state, wherein Q spatial relation(s), P antenna port(s), T antenna port group(s) of the uplink channel are determined based on a corresponding transmission state of the at least one transmission state in order, wherein Q, P, and T are positive integers.

14. The wireless terminal of claim 13, wherein a length of at least one of a transmitted precoding matrix indicator field or a SRS resource indicator field in the DCI is determined based on the maximum number of one of the downlink reference signal resources, the downlink reference signal ports, the transmission configuration indicator states, transmission states, the SRS resources or the SRS ports associated with the at least one transmission state.

15. A wireless communication method for use in a wireless network node, the wireless communication method comprising:
transmitting, to a wireless terminal, a first command associated with at least one transmission state; and
receiving, from the wireless terminal, an uplink channel,
wherein a spatial relation of the uplink channel is determined based on a first transmission state of the at least one transmission state,
wherein the at least one transmission state is associated with more than one downlink reference signals,
wherein a pathloss reference signal is determined based on at least one of the more than one downlink reference signals, and
wherein a pathloss estimation is determined based on an average value of more than one pathloss estimations corresponding to the more than one downlink reference signals,
wherein one of the at least one transmission state is associated with one or more reference signals, and wherein the at least one of the spatial relation of the uplink channel is determined based on one of the one or more reference signals associated with the first transmission state.

16. A wireless network node comprising:
a processor; and
a transceiver configured to:
transmit, to a wireless terminal, a first command associated with at least one transmission state, and
receive, from the wireless terminal, an uplink channel,
wherein a spatial relation of the uplink channel is determined based on a first transmission state of the at least one transmission state,
wherein the at least one transmission state is associated with more than one downlink reference signals,
wherein a pathloss reference signal is determined based on at least one of the more than one downlink reference signals, and
wherein a pathloss estimation is determined based on an average value of more than one pathloss estimations corresponding to the more than one downlink reference signals,
wherein one of the at least one transmission state is associated with one or more reference signals, and wherein the at least one of the spatial relation of the uplink channel is determined based on one of the one or more reference signals associated with the first transmission state.

* * * * *